United States Patent [19]

Kawabata et al.

[11] Patent Number: 5,355,297
[45] Date of Patent: Oct. 11, 1994

[54] THREE-LEVEL THREE-PHASE INVERTER APPARATUS

[75] Inventors: Takao Kawabata; Masato Koyama, both of Hyogo, Japan

[73] Assignee: Mitsubishi Denki Kabushiki Kaisha, Tokyo, Japan

[21] Appl. No.: 47,043

[22] Filed: Apr. 13, 1993

[30] Foreign Application Priority Data

Apr. 13, 1992 [JP] Japan ................... 4-092636

[51] Int. Cl.$^5$ ........................... H02M 7/515
[52] U.S. Cl. ........................ 363/43; 363/98; 363/132
[58] Field of Search ............... 363/40, 41, 43, 56, 363/58, 95, 97, 98, 131, 132

[56] References Cited

U.S. PATENT DOCUMENTS

| | | | |
|---|---|---|---|
| 4,855,893 | 8/1989 | Kratz | 363/136 |
| 4,881,159 | 11/1989 | Holtz et al. | 363/58 |
| 4,918,367 | 4/1990 | Pohjalainen | 318/801 |
| 4,953,069 | 8/1990 | Braun et al. | 363/41 |
| 5,060,129 | 10/1991 | Maruyama | 363/41 |
| 5,138,544 | 8/1992 | Jessee | 363/43 |

FOREIGN PATENT DOCUMENTS 2261063 of 1990 Japan.

OTHER PUBLICATIONS

"Consideration on PWM Control For Neutral Point Clamped Inverter"; 1991 National Convention Record I.E.E. Japan Applications Society.
"Control Strategy for a Three Phase AC Traction Drive with Three Level GTO PWM Inverter"; Jurgen K. Steinke; 19th Annual IEEE Power Electronics Specialists Conference; vol. 1 (Apr. 1988).
"DSP Based Space Vector PWM for Three-Level Inverter with DC-Link Voltage Balancing"; Liu et al.; 1991 International Conf. on Industrial Electronics, Control and Instrumentation; vol. 1.

Primary Examiner—Steven L. Stephan
Assistant Examiner—Adolf D. Berhane
Attorney, Agent, or Firm—Leydig, Voit & Mayer

[57] ABSTRACT

A three-level three-phase inverter apparatus operating on a proposed pulse width modulation method whereby good output voltages are obtained free of the effects of the minimum pulse width constraints of switching devices and whereby the neutral point voltage is controlled. The apparatus has a modulation circuit containing a microprocessor and a voltage vector selection circuit. The microprocessor divides one period into six segments of 60 degrees each. Each segment is divided into four triangular regions each determined by the vertexes of voltage vectors. An output voltage command is given as a vector. Once the segment and region to which a given vector belongs are determined, the voltage vectors corresponding to that region and the order in which to output these vectors are derived from the predetermined vector combinations and their output orders stored beforehand in the voltage vector selection circuit. Each vector output order is arranged so that one voltage vector is replaced by another through a switching operation of any one phase. The time average of these consecutively output voltage vectors in a given carrier period is modulated to coincide with the value of the command vector. This scheme provides good output voltage waveforms while controlling the neutral point voltage.

52 Claims, 20 Drawing Sheets

FIG. 10
| SWITCH STATE | S1 | on | off | off |
|---|---|---|---|---|
| | S2 | on | on | off |
| | S3 | off | on | on |
| | S4 | off | off | on |
| SYMBOL | | P | O | N |
| GRAPHIC REPRESENTATION | | 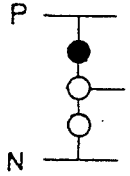 | 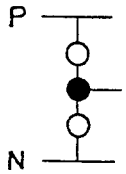 | 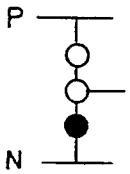 |
FIG. 11
| SYMBOLIC REPRESENTATION | GRAPHIC REPRESENTATION |
|---|---|
| PPP | 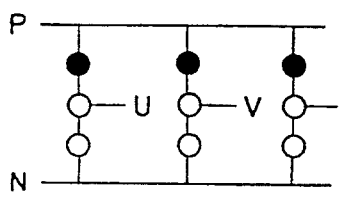 |
| PON | 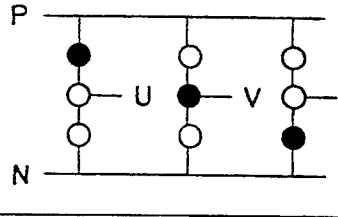 |
| PNN | 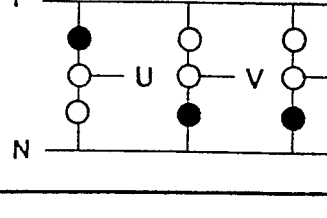 |

FIG. 12

| VOLTAGE VECTOR NAME | | VOLTAGE VECTOR SYMBOL | ZERO PHASE VOLTAGE | NEUTRAL POINT VOLTAGE CHANGE |
|---|---|---|---|---|
| ZERO VECTOR | O_P | PPP | $Ed/2$ | NO CHANGE |
| | O_O | OOO | 0 | |
| | O_N | NNN | $-Ed/2$ | |
| INTERMEDIATE VOLTAGE VECTOR MP | a_P | POO, OPO, OOP | $Ed/6$ | RAISED |
| | b_P | PPO, OPP, POP | $Ed/3$ | |
| INTERMEDIATE VOLTAGE VECTOR MN | a_N | ONN, NON, NNO | $-Ed/3$ | LOWERED |
| | b_N | OON, NOO, ONO | $-Ed/8$ | |
| L VECTOR | c | PON, OPN, NPO, NOP, ONP, PNO | 0 | VARYING WITH PHASE |
| LL VECTOR | a | PNN, NPN, NNP | $-Ed/8$ | NO CHANGE |
| | b | PPN, NPP, PNP | $Ed/8$ | |

FIG. 13

| VECTOR NAME | SEGMENT | | | | | |
|---|---|---|---|---|---|---|
| | A | B | C | D | E | F |
| a | PNN | NPN | NPN | NNP | NNP | PNN |
| b | PPN | PPN | NPP | NPP | PNP | PNP |
| c | PON | OPN | NPO | NOP | ONP | PNO |
| a$_P$ | POO | OPO | OPO | OOP | OOP | POO |
| b$_P$ | PPO | PPO | OPP | OPP | POP | POP |
| a$_N$ | ONN | NON | NON | NNO | NNO | ONN |
| b$_N$ | OON | OON | NOO | NOO | ONO | ONO |
| O$_P$ | PPP | | | | | |
| O$_O$ | OOO | | | | | |
| O$_N$ | NNN | | | | | |

FIG. 17

| REGION | VECTOR USED | REGION | VECTOR USED | VOLTAGE VECTOR GENERATION TIME |
|---|---|---|---|---|
| B1 | Op, Oo, On | A1 | Op, Oo, On | $T_1 = T(1 - 2k\sin(\theta + \frac{\pi}{3}))$ |
| D1 | bp, bn | C1 | ap, an | $T_2 = 2kT\sin(\frac{\pi}{3} - \theta)$ |
| F1 | ap, an | E1 | bp, bn | $T_3 = 2kT\sin\theta$ |
| B2 | ap, an | A2 | ap, an | $T_1 = 2T(1 - k\sin(\theta + \frac{\pi}{3}))$ |
| D2 | c | C2 | a | $T_2 = T(2k\sin(\frac{\pi}{3} - \theta) - 1)$ |
| F2 | a | E2 | c | $T_3 = 2kT\sin\theta$ |
| B3 | bp, bn | A3 | ap, an | $T_1 = 2T(1 - k\sin\theta)$ |
| D3 | c | C3 | c | $T_2 = T(2k\sin(\theta + \frac{\pi}{3}) - 1)$ |
| F3 | ap, an | E3 | bp, bn | $T_3 = T(1 - 2k\sin(\frac{\pi}{3} - \theta))$ |
| B4 | bp, bn | A4 | bp, bn | $T_1 = 2T(1 - k\sin(\theta + \frac{\pi}{3}))$ |
| D4 | b | C4 | c | $T_2 = 2kT\sin(\frac{\pi}{3} - \theta)$ |
| F4 | c | E4 | b | $T_3 = T(2k\sin\theta - 1)$ |

THREE-LEVEL THREE-PHASE INVERTER APPARATUS

BACKGROUND OF THE INVENTION:

1. Field of the Invention

The present invention relates to a three-phase inverter apparatus using switching devices such as transistors or GTO thyristors. More particularly, the invention relates to improvements in the method of controlling a pulse width modulation (PWM) of the three-level three-phase inverter apparatus, otherwise called an NPC (neutral point clamped) inverter apparatus.

2. Description of the Prior Art

FIG. 1 shows part of a typical prior art three-level inverter that uses GTO's (gate turn-off thyristors) as switching devices. This circuit has a first, a second, a third and a fourth switching device S1, S2, S3 and S4 connected in series between the positive and negative electrodes of a DC power supply having a neutral point output terminal. The junction between the first and the second switching devices and the junction between the third and the fourth switching devices are each connected to the neutral point output terminal via a clamp device such as a diode. The junction between the second and the third switching devices constitutes an inverter output terminal.

Whereas the commonly employed two-level inverter can output only two voltage levels (positive and negative), the circuit outlined above is capable of outputting three voltage levels:

(a) positive potential of the DC power supply when S1 and S2 are turned on;

(b) zero potential of the DC power supply when S2 and S3 are turned on; or (c) negative potential of the DC power supply when S3 and S4 are turned on.

As a result, the three-phase inverter such as one in FIG. 2 comprising three such single-phase circuits develops less harmonics in its output voltage than the two-level inverter.

A number of methods for controlling the three-level three-phase inverter have been proposed so far. One such method is disclosed in Japanese Patent Application Laid-Open No. HEI/2-261063, "Inverter Apparatus and AC Motor Driving System." FIG. 1 of this disclosure illustrates a PWM pulse processor that performs switching at points of intersection between the carrier and the output voltage command value of each of the phases. The method of the disclosure involves supplying the PWM pulse processor with signals of a zero-phase voltage command processor common to the three phases in order to minimize the voltage fluctuation at the neutral point of the DC power supply.

The PWM system proposed above sets switching times by resorting to the conventional chopping wave comparison; it fails to take into account the effects of the delays in the switching characteristic of the switching devices incorporated, i.e., effects of the minimum on-time (Tonmin) and minimum off-time (Toffmin) constraints. The effects are negligible with such rapid switching devices as transistors. But when it comes to slow-switching GTO thyristors constrained by their prolonged minimum on-time (Tonmin) and minimum off-time (Toffmin) ranging from 50 to 100 microseconds, supplying sine wave output voltage commands only produces severely distorted output waveforms.

The GTO thyristors incorporated will then be damaged if used in conjunction with a PWM circuit disregarding the constraints of Tonmin and Toffmin. The drawback is bypassed by providing an interlock circuit downstream of the PWM circuit that suppresses pulses whose widths are narrower than the minimum on- or off-time (Tonmin or Toffmin). This prevents the switching devices from performing switching of unduly short intervals. Unless such measures were taken, the output current and voltage of the inverter would fail to comply with the commands from a host control system.

A solution to the above difficulty is proposed in a recently published paper, "A Study on PWM Control Methods for Neutral Point Clamped Inverters" (submitted by Miura et al. to the 1991 National Conference on Industrial Applications of the Institute of Electrical Engineers; No. 103, pp. 448–453). The paper discloses a method for avoiding adverse effects of the minimum on-time (Tonmin) constraint when the output voltage command of the inverter is close to zero.

The proposed method is a PWM method based on chopping wave comparison (called unipolar PWM). FIGS. 2, 3 and 6 of the paper are included in this specification as FIGS. 3, 4 and 5, respectively, for reference. As shown in FIG. 3, this PWM method involves using chopping waves X for positive voltage control and chopping waves Y for negative voltage control. The chopping waves X have a positive amplitude ranging from 0 to +Emax, and the chopping waves Y have a negative amplitude of 0 through −Emax. When a control signal eu is positive, the devices S1 and S3 switch at the points of intersection between the signal and the chopping waves X; when the control signal eu is negative, the devices S2 and S4 switch at the points of intersection between the signal and the chopping waves Y.

If the voltage command is lowered as depicted in FIG. 4, issuing commands for soliciting pulses shorter than the minimum on-time (Tonmin) still results in output pulses of the Tonmin duration. That is, the actual output pulses fail to comply with the voltage commands requiring very short pulse widths. According to the proposed method, the above difficulty is circumvented as follows: the command value eu of, say, the U phase is first split in two, eu(+) representing the positive signal part and eu(−) denoting the negative signal part. Thus the command value for the U phase is given as $$eu = eu(+) + eu(-)$$

The two signal parts are each modified by a constant value $\Delta e$ that is slightly greater than the minimum on-time (Tonmin). That is, the U phase command value is given as $$eu = (eu(+) + \Delta e) + (eu(-) - \Delta e)$$

Arrangements are made so that the devices S1 and S3 switch at the points of intersection between positive chopping waves and the signal $eu(+)^* = (eu(+) + \Delta e)$. Likewise, the devices S2 and S4 are made to switch at the points of intersection between negative chopping waves and the signal $eu(-)^* = (eu(-) - \Delta e)$. In this manner, as shown in FIG. 5, the inverter output Vu swings in the positive and negative directions always with a pulse width greater than the minimum on-time (Tonmin). With the minimum on-time-related error thus removed, the voltage of the command value is obtained as an average value.

The methods cited above each concern pulse width control by use of modulated chopping waves. More recent developments are associated with the so-called voltage vector concept. It involves determining the pulse width in accordance with the switching status of each of the phases. One such PWM control method based on the voltage vector concept is disclosed in "DSP Based Space Vector PWM for Three-Level Inverter with DC-Link Voltage Balancing" (Hyo L. Liu, Nam S. Choi and Gyu H. Cho, IECON '91, pp. 197–203). FIG. 7 of this publication is included as FIG. 6 in this specification for reference. In a neutral point voltage control circuit mentioned in the publication, there is brought about a case where the current command vector is an SV vector, as it is called in the publication (the vector corresponds to an intermediate voltage vector $a_P$, $a_N$, $b_P$ or $b_N$, to be described in detail later in this specification). In that case, the time of LSV (corresponding to vector $a_N$ or $b_N$) is arranged to be increased and the time of USV (corresponding to vector $a_P$ or $b_P$) shortened if the deviation of the neutral point voltage is positive.

A special synchronization modulating method is devised whereby the USV and LSV are used on balance. It this manner, as the authors contend, the neutral point is balanced and, in the triangular regions Δ1, Δ2, Δ3 and Δ4 of FIG. 6, the voltage vectors are output in the following order (Δ4 is in fact not noted because it is in symmetry with Δ3):

Δi: 0N0—P00—000

Δ2: 0N0—PN0—P00

Δ3: 0N0—P0N (typographic error; PN0 is correct) —PNP

This modulation method, as depicted in FIG. 6, is characterized in not using the intermediate voltage vector of either the positive or the negative side at intervals of 60 degrees. Of the three zero vector variations, only 000 is used; PPP and NNN are not utilized.

Prior art three-level three-phase inverter apparatuses are typically controlled as outlined above. In the representative PWM control setup whereby the switching time is controlled by use of modified chopping waves, the voltage command value of sine waves is first compared with the modified chopping waves. The logical output from the comparison is used to control the signal for driving the switching devices of each of the phases. The constraints involved with this setup are not conducive to pursuing optimum control systems that comply with the circuit conditions specific to the three-level inverter.

Under the cited control method utilizing the voltage vector concept, there exist a plurality of voltage vectors which are different in switching status between phases but which have the same vector quantity each. Of these voltage vectors, only one is selected and, based on that vector alone, each triangular region is specified. It follows that an optimum control system cannot be pursued for each of the different regions. Consequently it is difficult to achieve favorable control characteristics as a whole.

SUMMARY OF THE INVENTION:

In view of the foregoing, it is an object of the present invention to provide a three-level three-phase inverter apparatus operating under a control system based on the voltage vector concept, the inverter apparatus making the most of the voltage vectors of substantially the same quantity each in order to obtain optimum control and performance characteristics.

It is another object of the present invention to provide a three-level three-phase inverter apparatus comprising switching devices which operate in a smooth and stable manner.

It is a further object of the present invention to provide a three-level three-phase inverter apparatus capable of offsetting the inflow and outflow of currents to and from that neutral point of a DC power supply which is split in two by a capacitor arrangement, the fluctuation of the potential at the divided neutral point being suppressed in a suitable manner.

It is a further object of the present invention to provide a three-level three-phase inverter apparatus which reduces substantially the types of voltage vectors for simplified control.

It is another object of the present invention to provide a three-level three-phase inverter apparatus capable of keeping the minimum on- and off-times of switching devices above a predetermined value, so that the switching devices such as GTO's having relatively long minimum on- and off-times may be incorporated.

According to a first aspect of the present invention and for achieving the above-mentioned objects, there is provided a three-level three-phase inverter apparatus comprising a three-level inverter for each of U, V and W phases, each three-level inverter containing: a direct current power supply having a neutral point output terminal and including a first, a second, a third and a fourth switching device connected in series between the positive and negative electrodes of the DC power supply; the junction between the first and the second switching devices and the junction between the third and the fourth switching devices being each connected to the neutral point output terminal via a clamp device; the junction between the second and the third switching devices constituting an inverter output terminal; wherein P represents the state in which the first and the second switching devices are turned on, 0 stands for the state in which the second and the third switching devices are turned on, and N denotes the state in which the third and the fourth switching devices are turned on; the switching states of each phase determining voltage vectors of which three contiguous vertexes constitute a region; the three-level three-phase inverter apparatus further comprising: voltage vector selecting means for selecting beforehand at least three voltage vectors constituting each vertex of the region, for determining beforehand the order in which to output the voltage vectors within a carrier period, and for storing the Voltage vectors and the voltage vector output order; voltage command generating means for outputting a voltage command in vector format; region determining means for receiving the voltage command in order to determine the region to which the voltage command is positioned per carrier period; operation time determining means for determining the allocation of operation times within the carrier period of each voltage vector selected for the region determined by the region determining means so that the inverter output voltage will coincide with the voltage command; and switching signal generating means for outputting a signal for driving the switching devices of each phase based on the operation time for each voltage vector.

According to a second aspect of the present invention, there is provided preferably a three-level three-phase inverter apparatus wherein the voltage vectors contiguous in the voltage vector output order stored in the voltage vector selecting means are such as to be switched from one vector to another within the switching time for any one phase, the switching being accomplished in any one of two transitions, one from P to 0 and the other from 0 to N.

According to a third aspect of the present invention, there is provided preferably a three-level three-phase inverter apparatus wherein the voltage vectors are divided into a positive vector group and a negative vector group, the positive vector group having two switching states P and 0, the negative vector group having two switching states N and 0, the voltage vector output order stored in the voltage vector selecting means being composed mixedly of vectors from both groups for consecutive output within a predetermined carrier period, whereby the fluctuation of the potential at the neutral point of the DC power supply is suppressed.

According to a fourth aspect of the present invention, there is provided preferably a three-level three-phase inverter apparatus wherein the voltage vectors in the positive and the negative vector groups are controlled in operation time allocation so as to suppress the fluctuation of the potential at the neutral point of the DC power supply.

According to a fifth aspect of the present invention, there is provided preferably a three-level three-phase inverter apparatus wherein the voltage vector selecting means classifies as one group the voltage vectors equal in vector magnitude and in zero-phase voltage so that the voltage vectors of each group are handled in a uniform manner from a control point of view.

According to a sixth aspect of the present invention, there is provided preferably a three-level three-phase inverter apparatus wherein a given region of the voltage vectors stored in the voltage vector selecting means is divided into a plurality of subregions, each of the subregions being assigned a different combination of voltage vectors to be consecutively output within a carrier period, whereby the minimum on- and off-times of the switching devices are kept above a predetermined value each.

According to a seventh aspect of the present invention, there is provided preferably a three-level three-phase inverter apparatus wherein the voltage vectors contiguous in the voltage vector output order stored in the voltage vector selecting means are such that between two contiguous regions, one voltage vector is replaced by another through a switching operation of any One phase, the switching being accomplished in any one of two transitions, one from P to 0 and the other from 0 to N.

As stated above, with the three-level three-phase inverter apparatus according to the first aspect of the invention, once the region to which the voltage command is positioned is determined, the voltage vector selected beforehand by the voltage vector selecting means for that region is read out. That is, the switching states of the phases and the order in which to output the voltage vectors are read out. When the operation time allocated to each voltage vector is determined by the operation time determining means, the operation time is converted by the switching signal generating means into a driving signal for output to the switching devices of each phase.

Further, with the three-level three-phase inverter apparatus according to the second aspect of the invention, the voltage vectors and the order in which they are output are adopted in such a manner that transition from one voltage vector to another is performed by single-phase switching alone. Because the switching between P and N is avoided, any surge-induced fluctuation in the DC voltage is suppressed.

Furthermore, with the three-level three-phase inverter apparatus according to the third aspect of the invention, the selected voltage vectors are composed mixedly of positive and negative vectors. Thus when the neutral point of the DC power supply is divided illustratively by use of a capacitor arrangement, the inflow and outflow of currents to and from the neutral point are offset and the fluctuation of the potential at the neutral point is suppressed accordingly.

Further, with the three-level three-phase inverter apparatus according to the fourth aspect of the invention, the positive and negative voltage vectors are controlled in operation time allocation in such a manner as to minimize the fluctuation of the potential at the neutral point of the DC power supply.

Furthermore, with the three-level three-phase inverter apparatus according to the fifth aspect of the invention, the voltage vectors equal in vector magnitude and in zero-phase voltage (e.g., voltage vectors P00, 0P0, 00P) are classified as one group (e.g., voltage vector aP). This reduces substantially the number of voltage vector types for simplified control.

Moreover, with the three-level three-phase inverter apparatus according to the sixth aspect of the invention, a given region of the voltage vectors is divided into a plurality of subregions, each of the subregions being assigned a different combination of voltage vectors to be consecutively output within a carrier period. This keeps the minimum on- an off-times of the switching devices above a predetermined value each.

Further, with the three-level three-phase inverter apparatus according to the seventh aspect of the invention, the conditions for voltage vector transition are met not only for transition within the same region but also between contiguous regions. This provides smooth and stable characteristics of the inverter apparatus as a whole.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

FIG. 10 is a view depicting the switching states designated by symbols P, 0 and N in connection with the invention;

FIG. 11 is a view sketching those switching states of a three-level three-phase inverter which are designated by the symbols P, 0 and N;

FIG. 12 is a view showing in tabular form the changes in the neutral point voltage for each voltage vector in connection with the invention;

FIG. 13 is a view depicting in tabular form specific switching states associated with vector names and segments in connection with the invention;

FIG. 17 is a view listing in tabular form typical voltage vectors and their generation times for use in various regions in connection with the invention;

DETAILED DESCRIPTION OF THE PREFERRED EMBODIMENTS

Preferred embodiments of the invention will now be described in detail referring to the accompanying drawings. The descriptions of the common component parts are omitted here to avoid unnecessary repetition.

Embodiment

Figure 7:
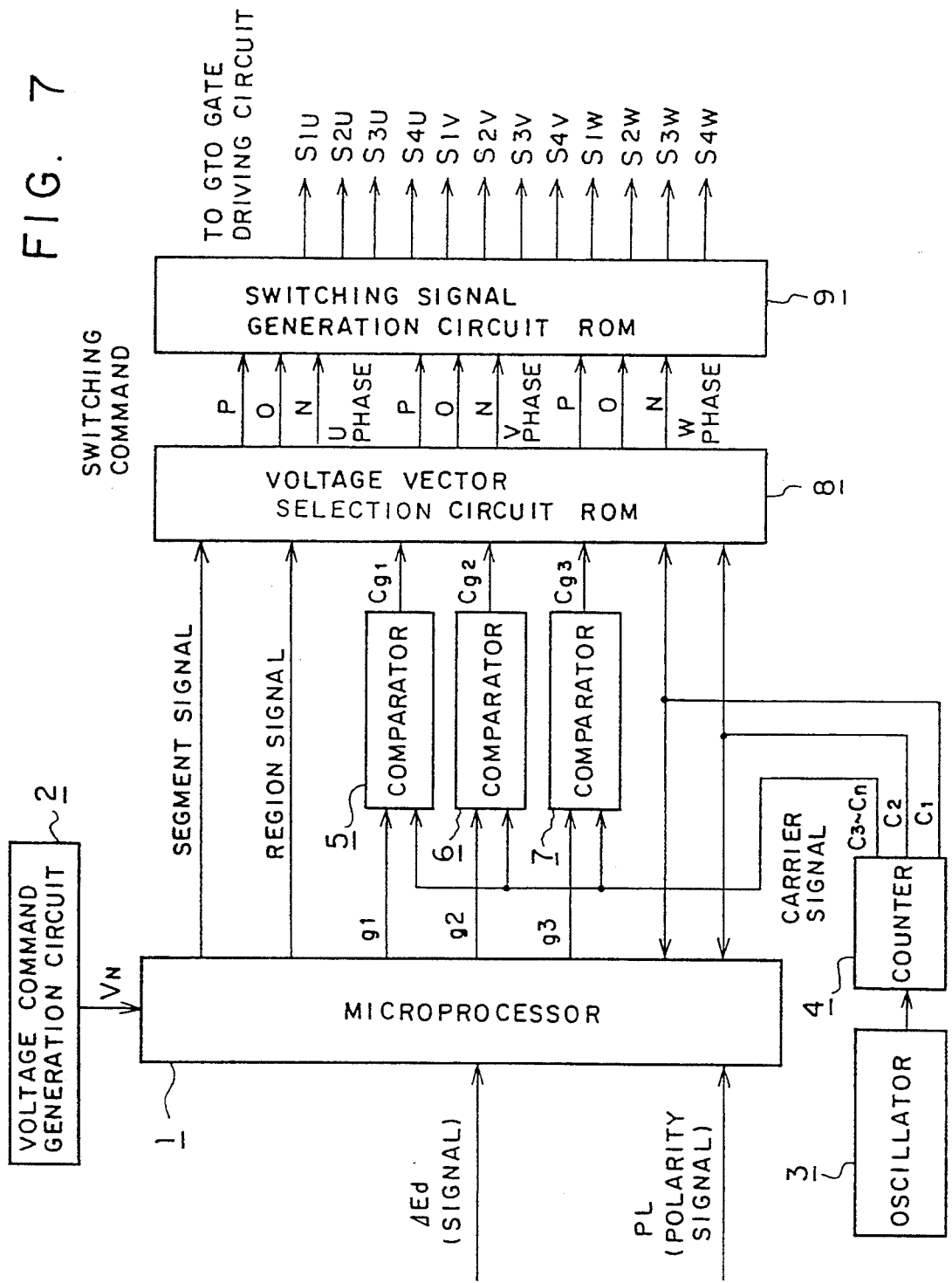
FIG. 7 is a circuit diagram of a three-level three-phase inverter apparatus embodying the present invention.
Figure 8:
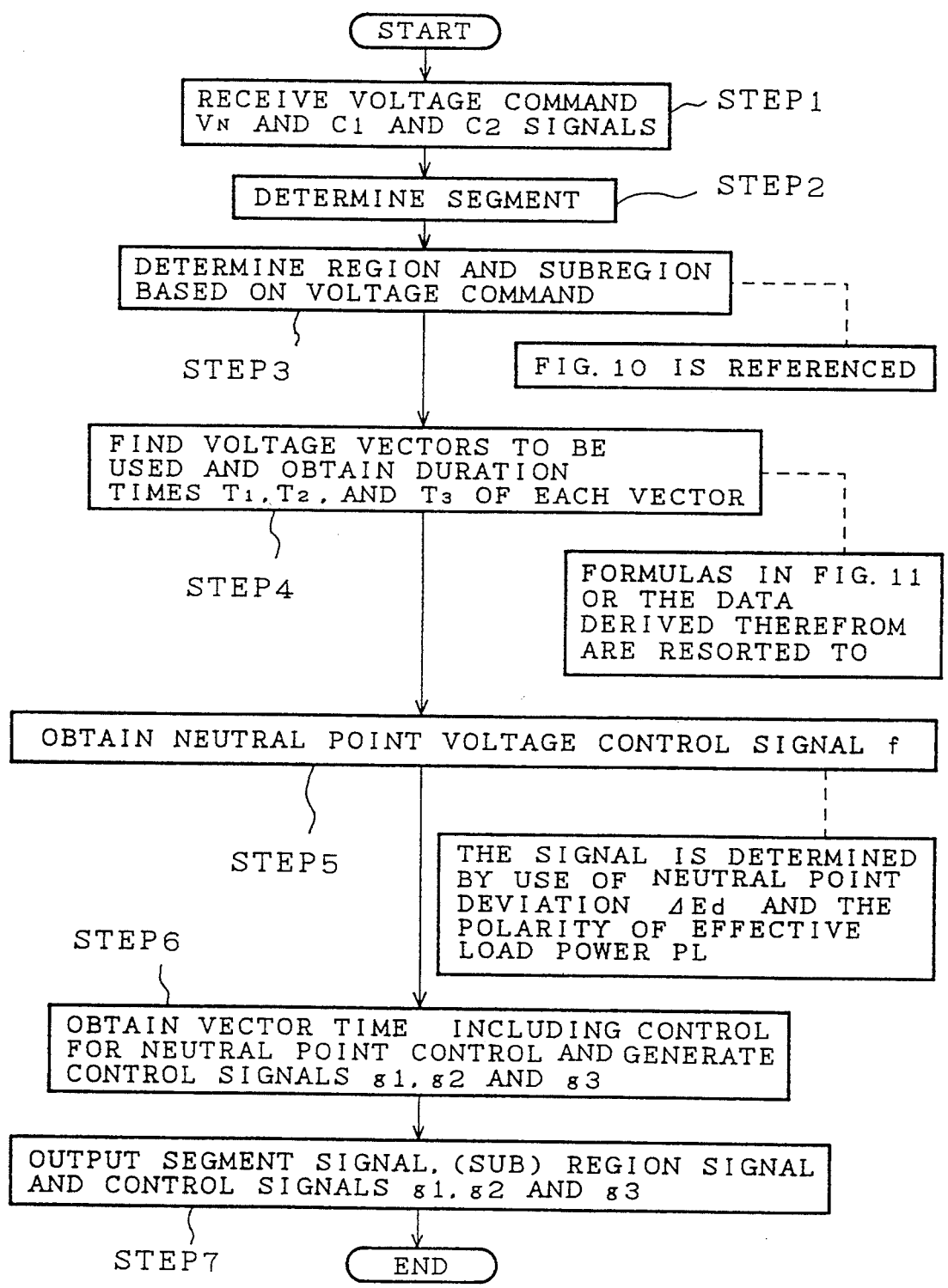
FIG. 8 is a flowchart of steps carried out by the microprocessor in the apparatus of FIG. 7.

FIG. 7 is a circuit diagram of a three-level three-phase inverter apparatus embodying the present invention by use of a microprocessor. FIG. 8 is a flowchart of steps carried out primarily by the microprocessor of this embodiment. Before the embodiment of the invention is described specifically in constitution and in operating principle, a preparatory description of how a three-level inverter works is in order.

Figure 9A:
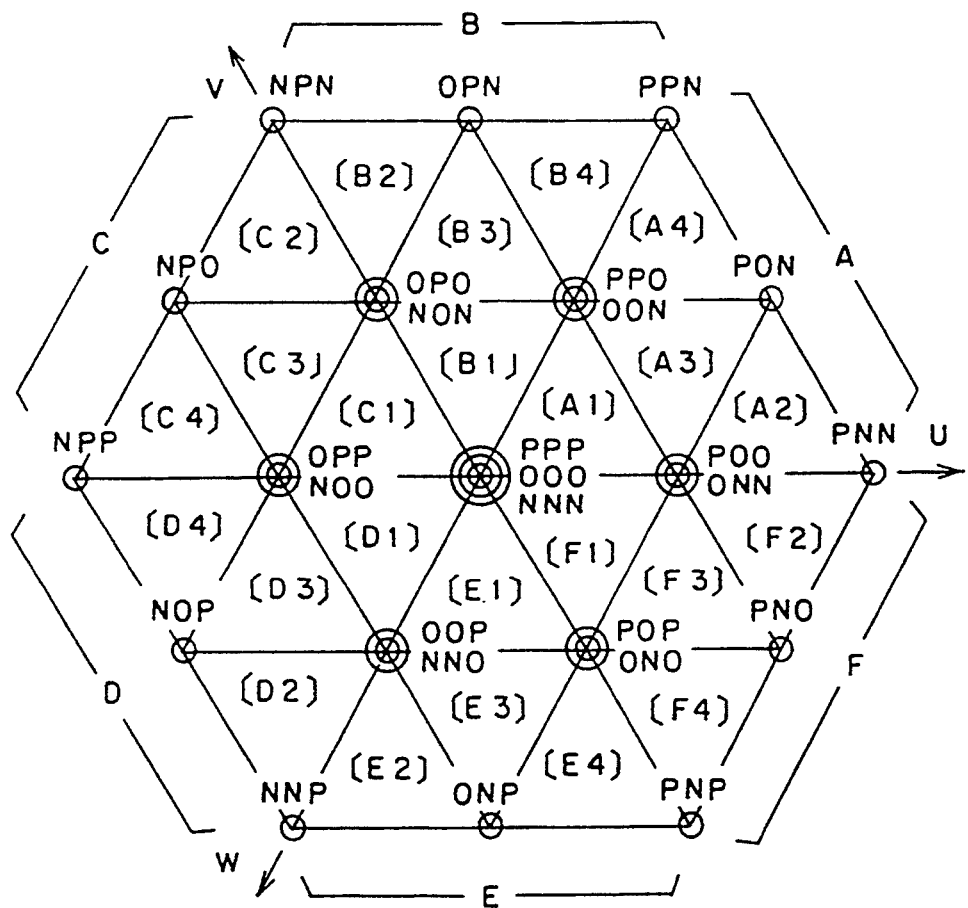
FIG. 9(a) depicts a set of voltage vectors having segments and regions applicable to a three-state three-phase inverter.

As shown in FIG. 9(a), the three-level inverter has zero vectors at the origin and has 12 vectors constituting a large hexagon, with six intermediate vectors located at the vertexes of a small hexagon. In FIG. 9(a), a single circle represents a single-voltage vector, a double circle denotes a double-voltage vector (of two voltage vectors), and a triple circle stands for a triple-voltage vector (of three voltage vectors). Thus the origin has three zero vectors. Twelve single circles around the large hexagon indicate 12 single-voltage vectors, and six double circles around the small hexagon denote six double-voltage vectors. That amounts to 27 voltage vectors ($=3+12+2\times 6$).

The double- or triple-voltage vector stands for the presence of two or three voltage vectors which generate the same voltage between output lines and which have different zero-phase voltages.

In the example of FIG. 9(a), segments 60 degrees apart are named A, B, C, D, E and F, and small triangles within each segment are regarded as regions called 1, 2, 3 and 4. For example, a given region may be referred to as A1, A2, A3 or A4.

For the sake of convenience, the switching states of the three-level inverter are designated by symbols P, 0 and N and graphically portrayed as shown in FIG. 10. Under this convention, the switching states of the three-level inverter are represented illustratively as PPP, P0N and PNN for the U, V and W phases, respectively, as depicted in FIG. 11. Likewise, the three zero vectors are represented by PPP, 000 and NNN, as shown in FIG. 9(a).

Figure 1:
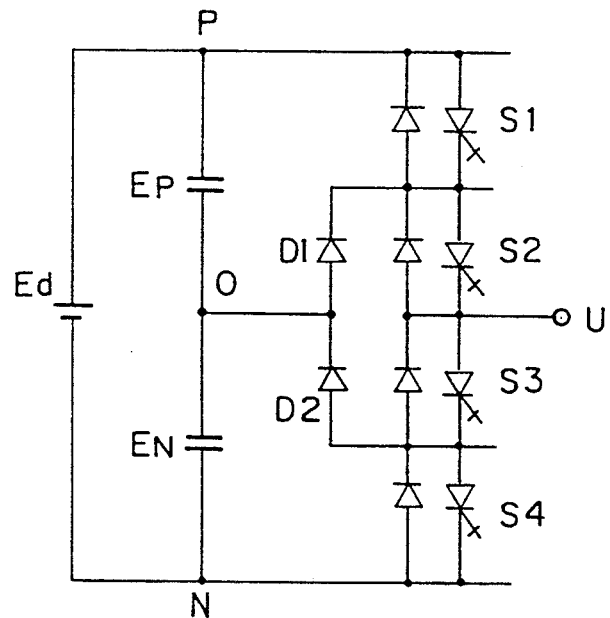
FIG. 1 is a circuit diagram showing a one-phase portion of a typical prior art three-level three-phase inverter.
Figure 2:
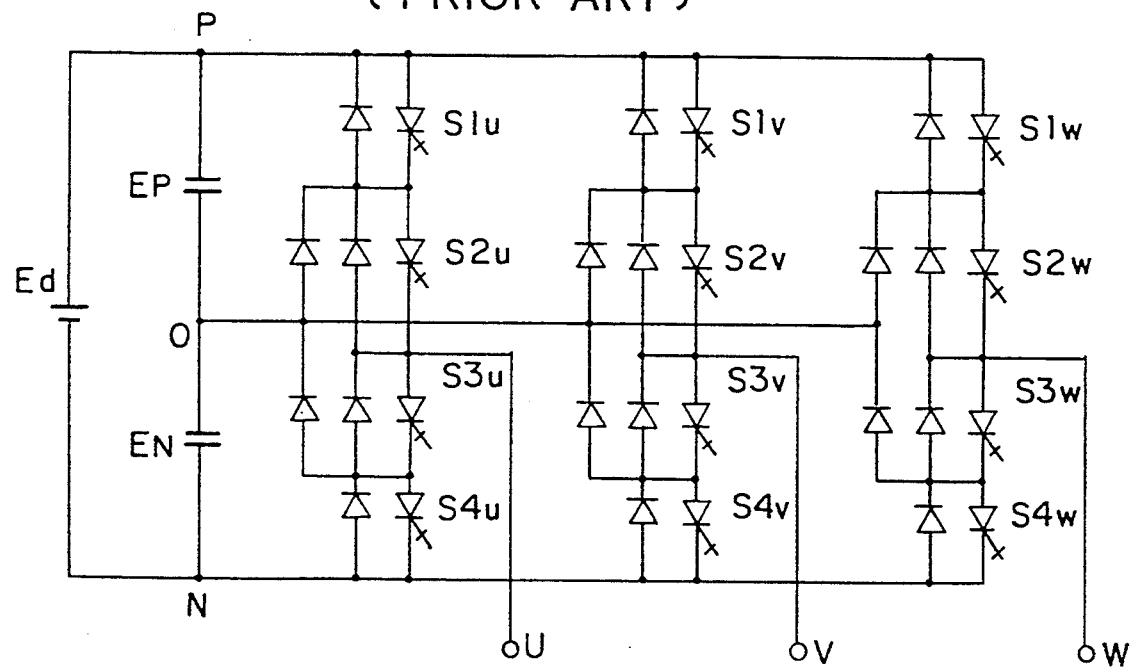
FIG. 2 is a circuit diagram depicting a three-phase portion of a typical prior art three-level three-phase inverter.
Figure 3:
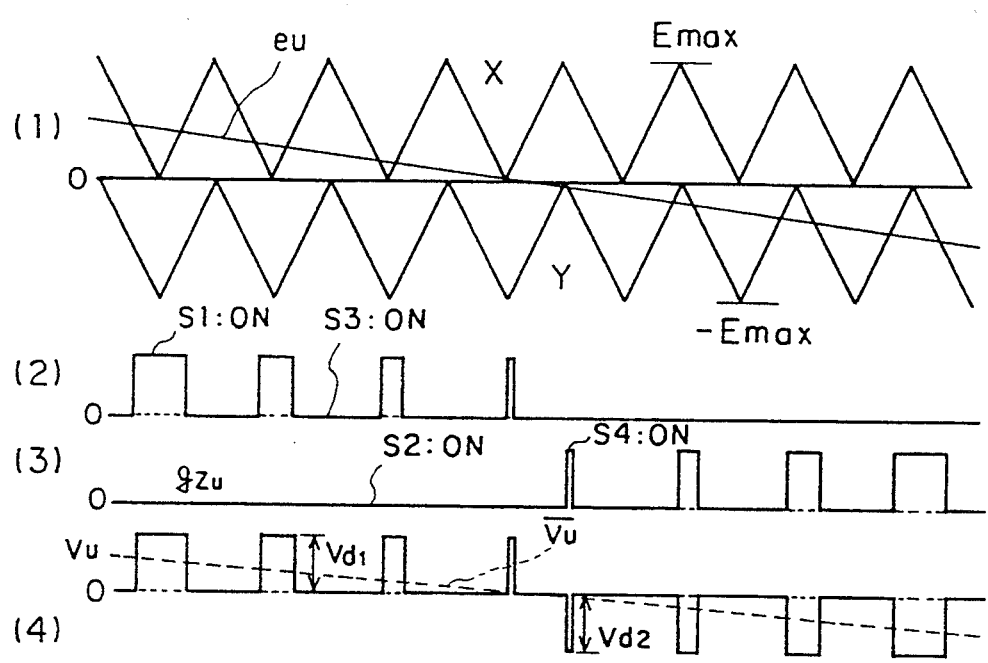
FIG. 3 is a view used to describe the operating principle of a prior art three-level inverter operating on the PWM method utilizing chopping wave comparison.
Figure 4:
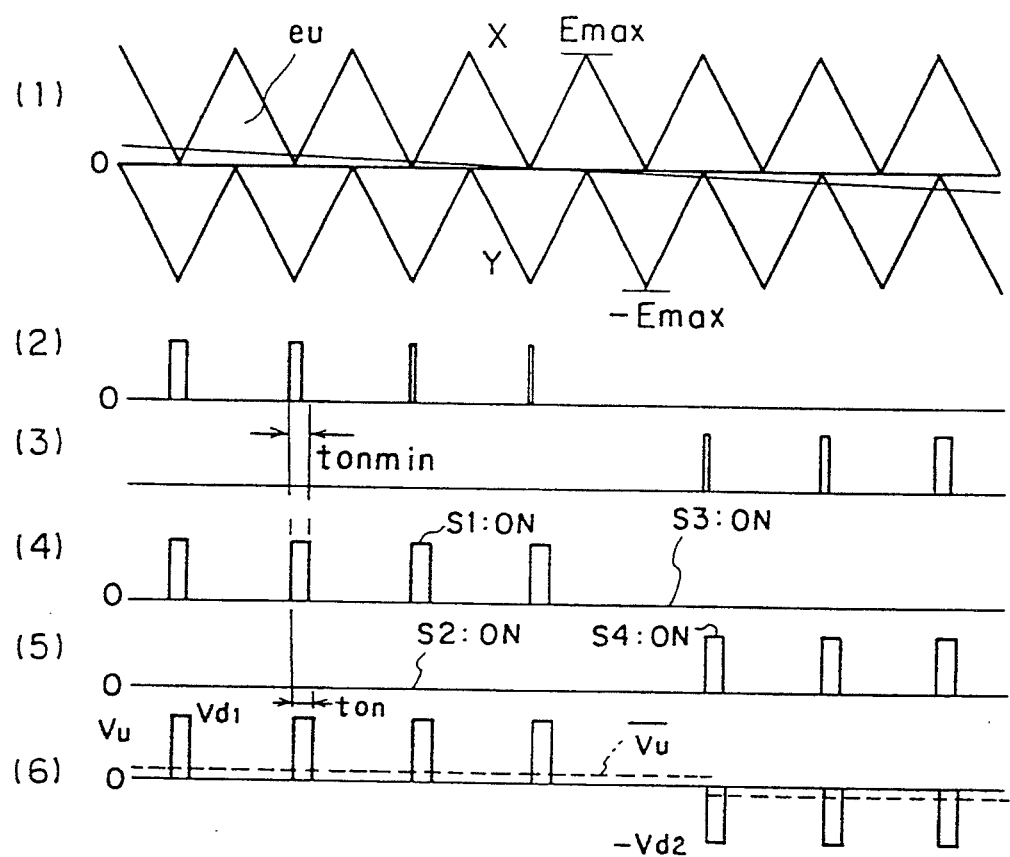
FIG. 4 is another view used to describe the operating principle of the prior art three-level inverter operating on the PWM method utilizing chopping wave comparison.
Figure 5:
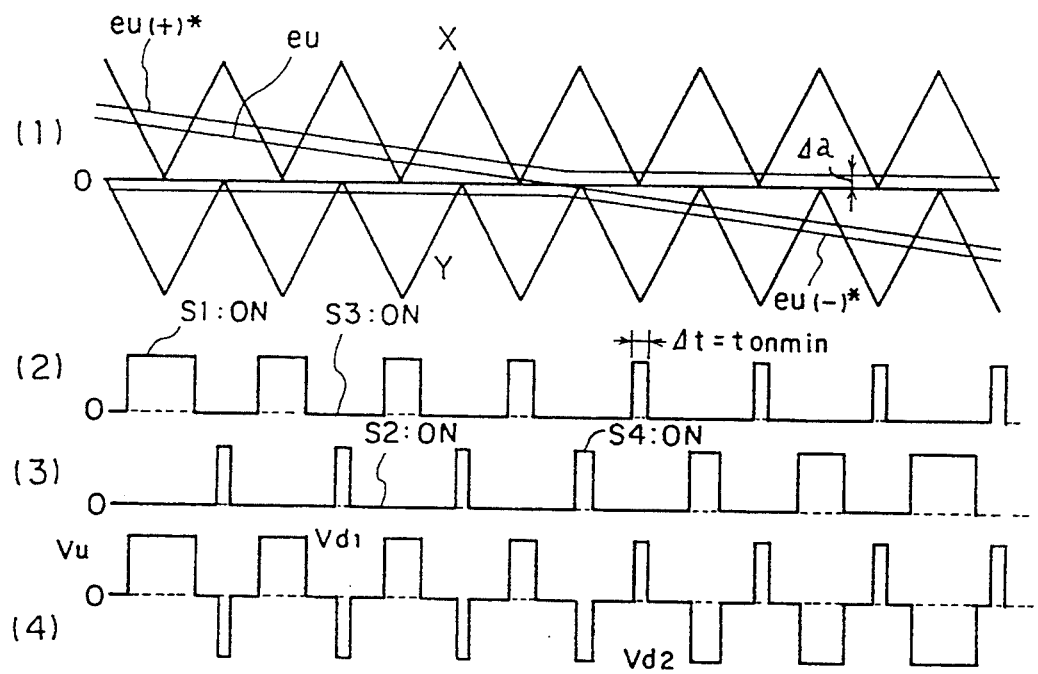
FIG. 5 is another view used to describe the operating principle of the prior art three-level inverter operating on the PWM method utilizing chopping wave comparison.
Figure 6:
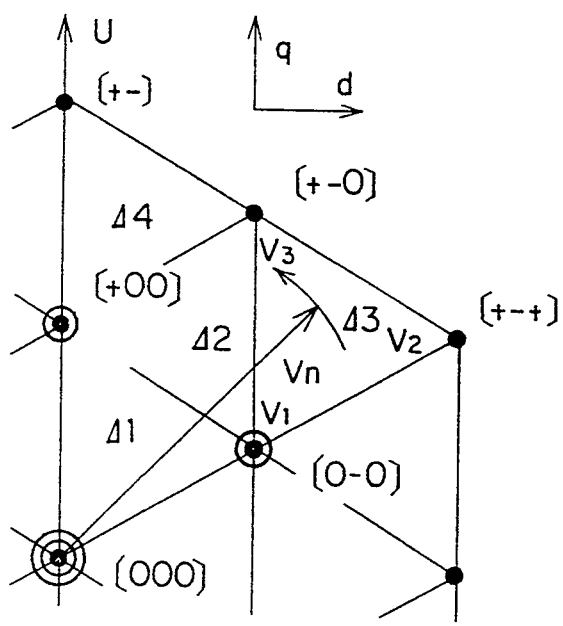
FIG. 6 is a view showing typical voltage vectors for use with a prior art three-level inverter operating on the voltage vector method.

Single-voltage vectors are represented, starting from 0 degree and in the counterclockwise direction, as PNN, P0N, PPN, 0PN, NPN, NP0, NPP, N0P, NNP, 0NP, PNP and PN0. Double-voltage vectors are represented by P00 and 0NN, PP0 and 00N, 0P0 and N0N, 0PP and N00, 00P and NN0, and P0P and 0N0. These double-voltage vectors have the same line voltage but differ in polarity: some using the positive side of a DC power supply (positive vectors) and the others using the negative side thereof (negative vectors). That is, the double-voltage vectors differ in zero phase voltage.

Where a three-level inverter has a neutral point divided by use of a capacitor arrangement in the framework of a positive-negative power supply, as shown in FIG. 2, the neutral point voltage varies depending on the inflow and outflow of neutral point currents. This makes it important to keep the neutral point voltage on balance. In this respect, it is necessary to study the relationship between various voltage vectors and the DC power supply, and in particular the nature of neutral point currents. For the sake of simplicity, it is assumed that the load used here is a three-phase balanced resistance load in an arrangement wherein a small reactor L is serially connected to a load resistor R for pulsating current prevention.

The three zero vectors PPP, 000 and NNN are irrelevant here because the load is not connected to the DC power supply. Of the 12 single-voltage vectors, the vectors PNN, PPN, NPN, NPP, NNP and PNP (those not containing 0) have their corresponding switches not connected to the neutral point. Because these vectors connect the positive and negative terminals of the power supply to the load, no current flows to the neutral point. These six voltage vectors are the largest of the vectors involved; they are called here LL vectors.

Six vectors PON, OPN, NP0, N0P, 0NP and PN0 are the second largest voltage vectors; they are called L vectors. The L vectors connect all of the positive and negative terminals and the neutral point to the load. Thus currents flow to the neutral point. Whether currents flow to or from the neutral point is determined by the power factor of the load and by the operation phase of the inverter.

Of the double-voltage vectors, those made of P and 0 (P00, PP0, 0P0, 0PP, 00P and P0P) connect the positive terminal and the neutral point to the load. Thus with the resistance load, currents flow into the neutral point. These intermediate voltage vectors are of medium magnitude and utilize the positive side of the DC power supply. As such, the intermediate voltage vectors are called MP vectors.

Voltage vectors made of N and 0 (0NN, 00N, N0N, N00, NN0 and 0N0) connect the negative terminal and the neutral point to the load. Thus with the resistance load, currents flow from the neutral point. These intermediate voltage vectors are of medium magnitude and utilize the negative side of the DC power supply. As such, the intermediate voltage vectors are called MN vectors.

The description above is summarized in tabular form in FIG. 12 listing the changes in the neutral point voltage for each of the voltage vectors in effect when the three-level inverter with its neutral point divided by a capacitor arrangement is operated under the resistance load.

Figure 9B:
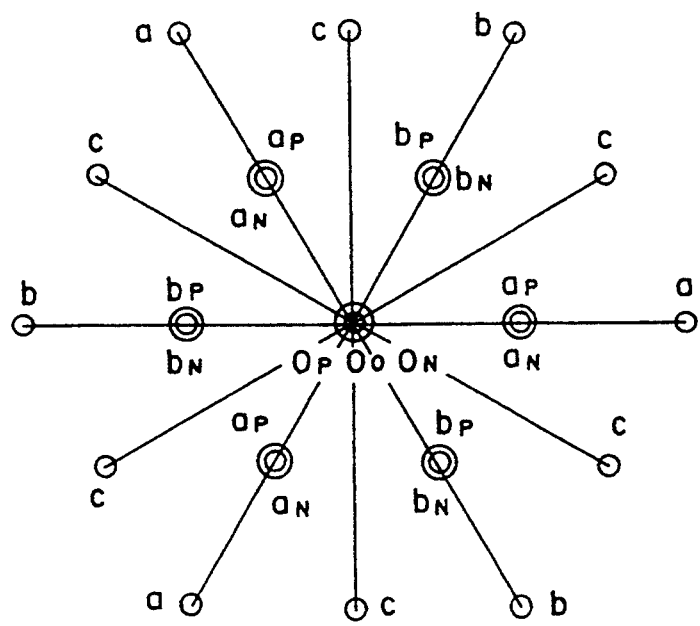
FIG. 9(b) illustrates a set of voltage vectors applicable to a three-state, three-phase inverter.

In FIG. 12, the voltage vectors are classified into types called a, $a_P$, $a_N$, b, $b_P$, $b_N$, c, etc. Illustratively, vectors P00, 0P0 and 00P fall into the vector type $a_P$. These three vectors have the same zero phase voltage and are 120 degrees apart in phase. In that sense, the three may be considered the same vector expressed as the vector $a_P$. Redrawing FIG. 9(a) by use of these representative vector types results in what is shown in FIG. 9(b). As can be seen in FIG. 9(b), the same phenomenon occurs at intervals of 120 degrees and a symmetry is observed every 60 degrees. It follows that the modulation method illustratively for a segment of 0 through 60 degrees, i.e., the combination of voltage vectors and the order in which they are output for that segment, may be applied to other segments once the method is clarified. When the modulation method is determined by use of appropriate vector names, specific switching operations are implemented for the segment in question.

On the basis of the above discussion, the invention introduces the concept of contiguous voltage vectors. Where any one phase is considered, transition between P and 0 or between 0 and N is accomplished by a single switching operation, but not between P and N. For the three phases, consider the switching status of, say, PON=c. In that case, transition occurs from P to 0 for the U phase, from 0 to P or N for the V phase, and N to 0 for the W phase. It is assumed in principle that switching does not occur simultaneously for any two phases. On that assumption, there are only four voltage vectors (PPN=b, 00N=$b_N$, P00=$a_P$, PNN=a) for which transition by a single switching operation from the voltage vector PON=c is available. These four vectors are called the contiguous voltage vectors of PON. Although simultaneous switching for two phases is possible as a main circuit operation, it is not preferred because it can promote surge-induced changes in the DC voltage.

Figure 14:
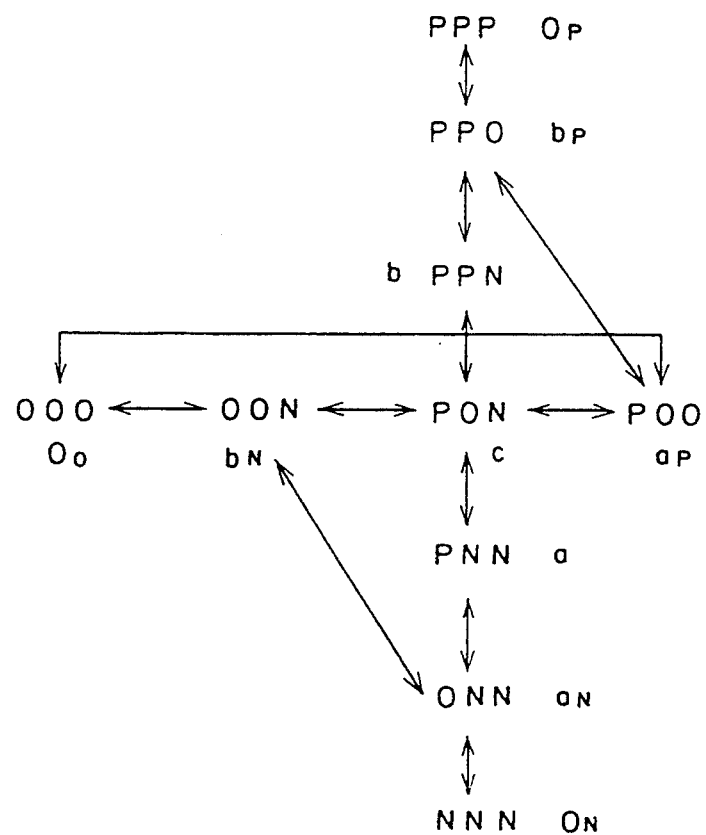
FIG. 14 is a view used to describe the concept of voltage vector contiguity.

The contiguous voltage vectors are obtained likewise for the vectors other than c. FIG. 14 shows 10 voltage vectors arranged in contiguous relation within the segment of 0 through 60 degrees given in FIG. 9(a). In FIG. 14, the voltage vectors coupled by a two-way arrow constitute a relation that permits smooth transition in a single switching operation.

Figure 15:
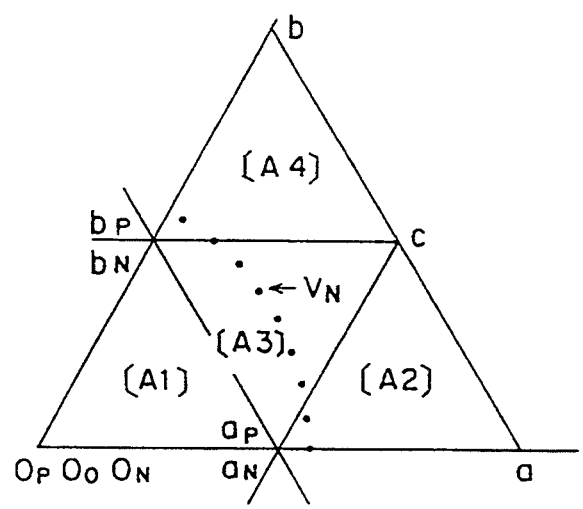
FIG. 15 is a view showing how voltage commands are issued at intervals of a sampling time.

How the three-level inverter works has been described so far. Below is a description of the PWM method according to the invention for control of microprocessor-based sampling. Under microprocessor control of the invention, a voltage command generation circuit 2 (in FIG. 7) generates a command for the inverter to generate voltages so that a segment of, say, 0 through 60 degrees is provided (as shown in FIG. 15). The command is issued illustratively 50 times at intervals of a sampling time TS of 1 ms for the duration of 50 ms when the output frequency is 20 cycles. Under analog control, the generated voltage commands plot a continuous circular locus; under microprocessor control, these commands appear intermittently. With variable frequency inverters, the increment of the electrical angle at which a command is issued becomes greater as the output frequency is raised. The locus of the commands thus issued becomes spiral. The PWM arrangement of the inverter, which is also a discontinuous phenomenon, is germane to such discrete commands. The relationship is particularly favorable when the sampling time TS is the same as the carrier period T of PWM or is at least in synchronism with a multiple of the latter. The above operations carried out by the microprocessor amount to step 1 in FIG. 8.

When discrete voltage commands are given as described above, the embodiment of the invention generates designated voltage vectors not through conventional chopping wave comparison but through logical decision and calculation by the microprocessor for acquiring the time average during carrier periods T. The method is called "voltage vector average value control PWM" hereunder.

For example, given a command $V_N$ of FIG. 15, modulation takes place by use of the three vectors at the vertexes of a triangle A3 surrounding $V_N$, the vectors being $a_P$ (or $a_N$), $b_P$ (or $b_N$) and c which are closest to $V_N$. Specifically, the vectors $a_P$ (or $a_N$) is generated for a time $T_1$, $b_P$ (or $b_N$) for a time $T_2$ and c for a time $T_3$, where $T_1+T_2+T_3=T$. $V_N$ is then generated as the time average of the three vectors.

For a double-voltage vector example of, say, vectors $a_P$ and $a_N$, the vector $a_P$ is generated for a time $T_{aP}$ and the vector $a_N$ for a time $T_{aN}$, where $T_{aP}+T_{aN}=T_1$. One feature proposed by the invention causes the neutral point voltage to be balanced by suitably controlling the time allocation between the two vectors.

Figure 16:
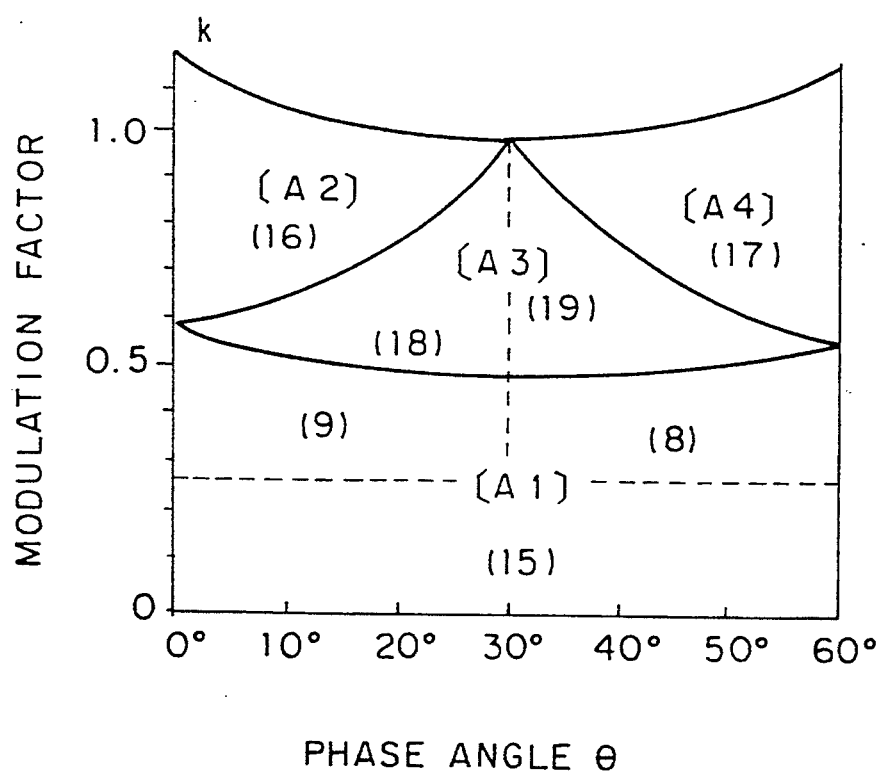
FIG. 16 is a view illustrating in polar coordinates the boundaries of a region and of subregions therein to which different modulation methods are applied in a segment ranging from 0 to 60 degrees.

The same applies when the voltage command is positioned in any other triangle A1, A2 or A4. According to the invention, once a voltage command is issued, a decision is made as to which triangle (called the region hereunder) the command belongs to. This requires expressing the command as $V_N=(\theta, k)$ in polar coordinates, where k (modulation factor)$=2|V_N|[\sqrt{3}Ed]$ and $\pi/3 \geq \theta \geq 0$. As discussed in connection with FIG. 9, the same modulation applies every 60 degrees. Thus a decision is made as to which segment (A, B, C, D, E, F in FIG. 9(a)) the voltage command is to enter starting from M=($\theta$/integer part of 60°). FIG. 16 depicts in polar coordinates what is shown in FIG. 15. Through comparison of the data thus indicated, it is possible to determine which region the voltage command belongs to. These operations amount to steps 2 and 3 in FIG. 8. The microprocessor 1 sends a segment signal and a region signal in steps 2 and 3, respectively, to a voltage vector selection circuit 8 to be described later.

In step 4 of FIG. 8, the time allocation among the regions A1, A2, A3 and A4 is determined when the command is given in polar coordinates ($\theta$, k). FIG. 17 lists in tabular form typical generation times calculated for and allocated to various vectors used.

Described below is how the generation times shown in FIG. 17 are obtained for the voltage vectors of the respective regions. Referring to FIG. 9(a), 27 voltage vectors shown therein are expressed in complex numbers and represented by $\alpha$. That is, $$\alpha = \exp(j2\pi/3) = -1/2 + j\sqrt{3/2}$$
$$1 + \alpha + \alpha^2 = 0$$

The switching states such as PPN for the U, V and W phases are generically represented by a switching function S each ($S_U$, $S_V$ and $S_W$ for U, V and W phases respectively). The switching states for the three phases as a whole are represented by $S_U S_V S_W$.

It is assumed that the neutral point of the DC power supply in FIG. 2 is at a zero potential and that Ed=1 and $E_P=E_N\frac{1}{2}$. On these assumptions, the S=$\frac{1}{2}$ for the switching state P;
S=0 for the switching state 0; and
S=$-\frac{1}{2}$ for the switching state N.

Because the U phase is in the true axis direction, V phase in the $\alpha$ direction and W phase in the $\alpha^2$ direction, the voltage vector is expressed in complex numbers as $$S_U + S_V\alpha + S_W\alpha^2.$$

On the basis of the above considerations, the voltage vectors for the section A are expressed in complex numbers as follows:

(a) Three zero vectors $0_P$=PPP, $0_0$=000 and $0_N$=NNN turn out to be all zero when expressed in complex numbers. The vector is given as $V_0$.

(b) The voltage vectors $a_P$=P00 and $a_N$=0NN are $\frac{1}{2}$ each when expressed in complex numbers. The vector is given as $V_1$.

(c) The voltage vectors $b_P$=PP0 and $b_N$=00N are $\frac{1}{4}+j\sqrt{\frac{3}{4}}$ each when expressed in complex numbers. The vector is given as $V_2$.

(d) The voltage vector a=PNN is 1 when expressed in complex numbers. The vector is given as $V_3$.

(e) The voltage vector c=P0N is $\frac{3}{4}+j\sqrt{\frac{3}{4}}$ when expressed in complex numbers. The vector is given as $V_4$.

(f) The voltage vector b=PPN is $\frac{1}{4}+j\sqrt{\frac{3}{4}}$ when expressed in complex numbers. The vector is given as $V_5$.

Consider a case where the voltage command is positioned in the region A1. If the voltage command vector has an amplitude of V and an angle of $\theta$, the voltage-time product of this voltage command vector for the carrier period T is given as $$VT \exp(j\theta) = VT \cos\theta + jVT \sin\theta$$

Meanwhile, where three vectors $V_0$, $V_1$ and $V_2$ of the region A1 are generated for $T_1$, $T_2$ and $T_3$, respectively, the voltage-time product involved is given as $$V_0T_1 + V_1T_2 + V_2T_3$$

In order to make the two voltage-time products equal, $T_1$, $T_2$ and $T_3$ need only be determined so that the following equations will hold:

$$V_0T_1 + V_1T_2 + V_2T_3 = VT\cos\theta + jVT\sin\theta$$
$$T_1 + T_2 + T_3 = T$$

Since $$V_0 = 0;$$
$$V_1 = 1/2; \text{ and}$$

$$V_2 = 1/4 + j\sqrt{3/4};$$

these are inserted in the preceding equations and the results are arranged for the real number part and the imaginary number part. This provides the following equations:

$$(1/2)T_2 + (1/4)T_3 = VT\cos\theta$$
$$(\sqrt{3}/4)T_3 = VT\sin\theta$$

Solving the above equations provides the expressions applicable to the region A1 of FIG. 17:

$$T_1 = T(1 - 2k \sin(\theta + \pi/3))$$

$$T_2 = 2kT \sin(\pi/3 - \theta)$$

$$T_3 = 2kT \sin\theta$$

Since it is stipulated that Ed=1, the modulation factor is given as $k=2V/\sqrt{3}$.

Likewise, when the voltage command vector exists in the regions 2 through 4, the following expressions hold for each region based on the voltage vectors corresponding to the vertexes of the respective regions:

Region 2: $V_1T_1 + V_3T_2 + V_4T_3 = VT\cos\theta + jVT\sin\theta$

Region 3: $V_1T_1 + V_4T_2 + V_2T_3 = VT\cos\theta + jVT\sin\theta$

Region 4: $V_2T_1 + V_4T_2 + V_5T_3 = VT\cos\theta + jVT\sin\theta$

Solving these expressions provides the vector generation times for the respective regions, as shown in FIG. 17.

As an alternative to the calculation in step 4 (FIG. 8) of individual generation times according to the formulas in FIG. 17, the times may be stored in tabular form in a ROM from which necessary times are read out and determined.

As shown in FIG. 17, when the command is in the region A1, there are seven usable vectors $0_P$, $0_0$, $0_N$, $a_P$, $a_N$, $b_P$ and $b_N$. However, according to the above-mentioned "voltage vector average value control PWM" principle, PWM is made available when there are three vectors: one selected from among $0_P$, $0_0$ and $0_N$; another from $a_P$ and $a_N$; and another from $b_P$ and $b_N$. What needs to be considered here is which vectors should be selected and in what order the selected vectors should be output. The invention allows any voltage vectors to be selected and any vector output order to be determined (i.e., modulation method is established) for each region so that desired control characteristics are acquired in a desired control setup. This is the biggest advantage of this invention. Below is a detailed description of how such modulation methods are established with the embodiment.

What is useful here is the contiguous relation discussed above. The seven vectors should be used in the order that complies with the contiguous relation shown in FIG. 14. The order is:

$$0_P <-> b_P <-> a_P <-> 0_0 <-> b_N <-> a_N <-> 0_N$$

According to the voltage vector average value control PWM principle, PWM is made available where there are three vectors corresponding to the vertexes of a triangle. Thus, of the seven vectors above, three are randomly combined for PWM, constituting the following five combinations:

(1) $0_P <-> b_P <-> a_P$ (2) $b_P <-> a_P <-> 0_0$ (3) $a_P <-> 0_0 <-> b_N$ (4) $0_0 <-> b_N <-> a_N$ (5) $b_N <-> a_N <-> 0_N$

It should be noted that the voltage vector average value control PWM is made available where four, five, six or seven vectors are utilized. In such cases, the possible vector arrangements are:

(6) $0_P <-> b_P <-> a_P <-> 0_0$ (7) $0_0 <-> b_N <-> a_N <-> 0_N$ (8) $b_P <-> a_P <-> 0_0 <-> b_N$ (9) $a_P <-> 0_0 <-> b_N <-> a_N$

(10) $b_P <-> a_P <-> 0_0 <-> b_N <-> a_N$

(11) $0_P <-> b_P <-> a_P <-> 0_0 <-> b_N$

(12) $a_P <-> 0_0 <-> b_N <-> a_N <-> 0_N$

(13) $0_P <-> b_P <-> a_P <-> 0_0 <-> b_N <-> a_N$

(14) $b_P <-> a_P <-> 0_0 <-> b_N <-> a_N <-> 0_N$

(15) $0_P <-> b_P <-> a_P <-> 0_0 <-> b_N <-> a_N <-> 0_N$

The vectors are preferably output in the above orders and in the reverse thereof for alternate vector output.

In evaluating which of the 15 PWM methods listed above is the best, the critical factor to be considered is the balance of the neutral point voltage in the DC power supply described above.

As depicted in FIG. 12, the neutral point voltage is raised with the vectors $a_P$ and $b_P$ and lowered with the vectors $a_N$ and $b_N$. This means that the modulation methods (1), (2) and (6) above cause the neutral point voltage to increase while the modulation methods (4), (5) and (7) lower the voltage.

With PWM under the method (3) utilizing the vectors $a_P$ and $b_N$, the neutral point voltage increases when the angle $\theta$ is close to 0 because the vector $a_P$ is frequently used, and the voltage drops when the angle $\theta$ is close to 60 degrees because the vector $b_N$ is then used frequently. This method is not suitable for low-frequency operations because the neutral point voltage pulsates considerably due to slow phase changes.

For the reasons above, the methods (1) through (7) are eliminated. The remaining methods (8) through (15) satisfy this condition proposed by the invention: for combinations of $a_P$ and $a_N$, of $b_P$ and $b_N$, or of these four vectors, the neutral point voltage must be controlled by appropriately arranging the time allocation between MP and MN vectors.

What then needs to be considered for the remaining vector combinations is whether or not short-duration switching is required of each. In this respect, there are specific constraints on, say, the region A1 as follows:

(a) When the vectors $b_P$ and $b_N$ become small near zero degree, the vector combinations requiring short-duration switching are not available.

(b) When the vectors $a_P$ and $a_N$ become small near 60 degrees, the vector combinations requiring short-duration switching are not available.

(c) When the zero vector becomes small close to the region A3 away from the origin, the vector combinations requiring short-duration switching are not available.

(d) When the vectors $a_P$, $a_N$, $b_P$ and $b_N$ all become small near the origin, the vector-combinations requiring short-duration switching are not available.

FIGS. 18 and 19 depict typical voltage waveforms of the respective phases under the PWM methods (8) through (15) for the region A1. The waveforms in these figures are used as the basis for carrying out the evaluation above. Adding the constraints of (a) through (d) above to these voltage waveforms translates into the views of FIG. 21 in which the portions where the respective PWM methods cannot be used are shown in hatching.

Figure 18A:
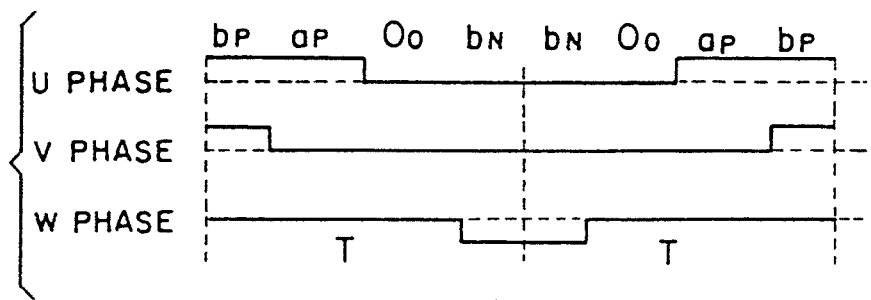
FIGS. 18A–18D depict typical voltage waveforms of the respective phases under modulation methods (8) through (11) for a region A1 in connection with the invention.
Figure 18B:
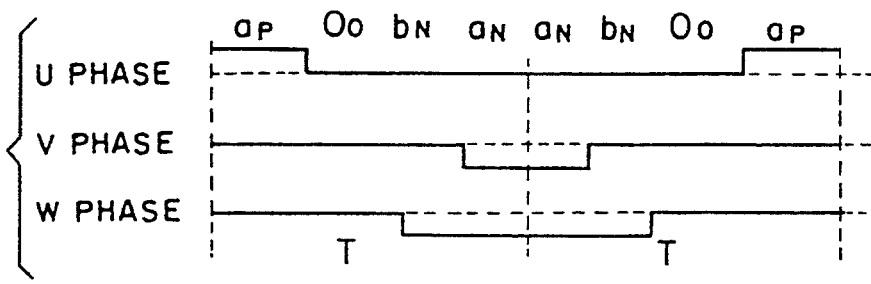
Figure 18C:
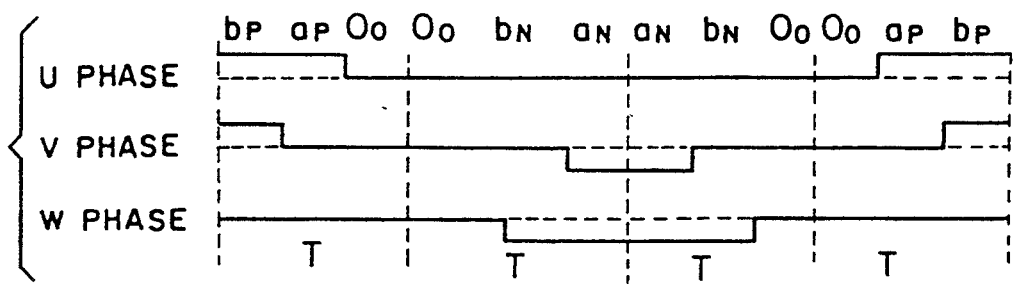
Figure 18D:
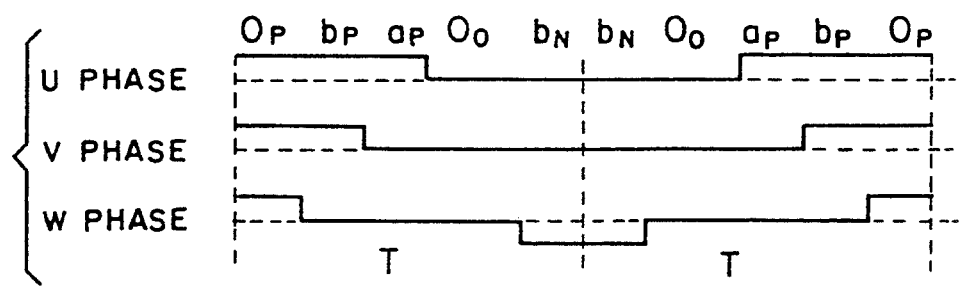
Figure 19A:
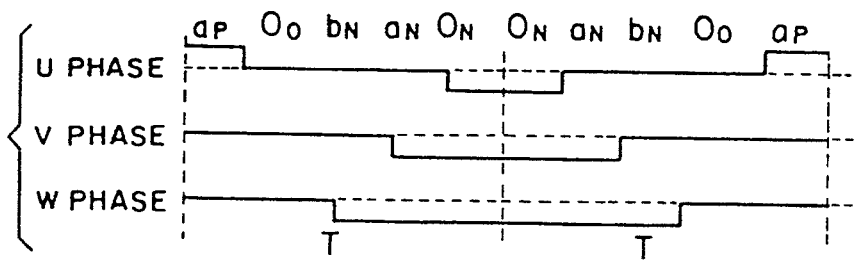
FIGS. 19A–19D illustrate typical voltage waveforms of the respective phases under modulation methods (12) through (15) for the region A1 in connection with the invention.
Figure 19B:
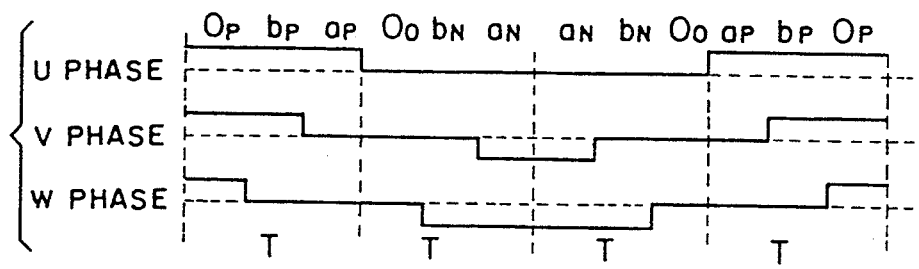
Figure 19C:
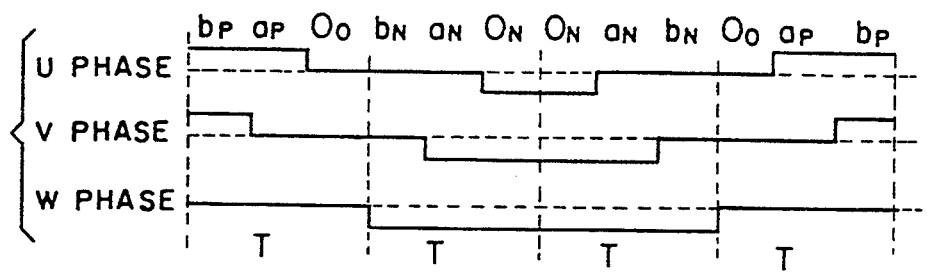
Figure 19D:
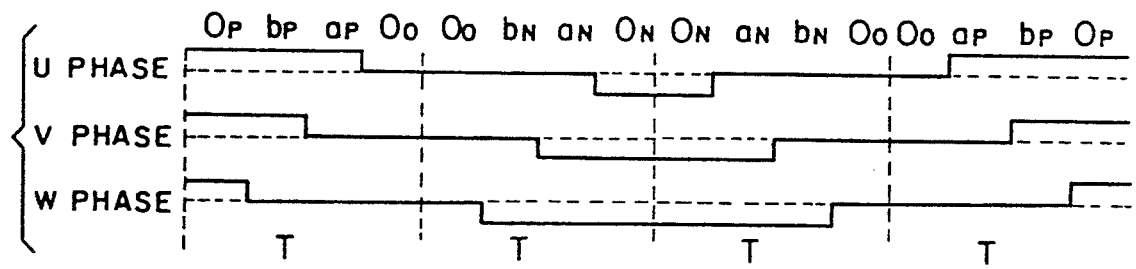
Figure 21:
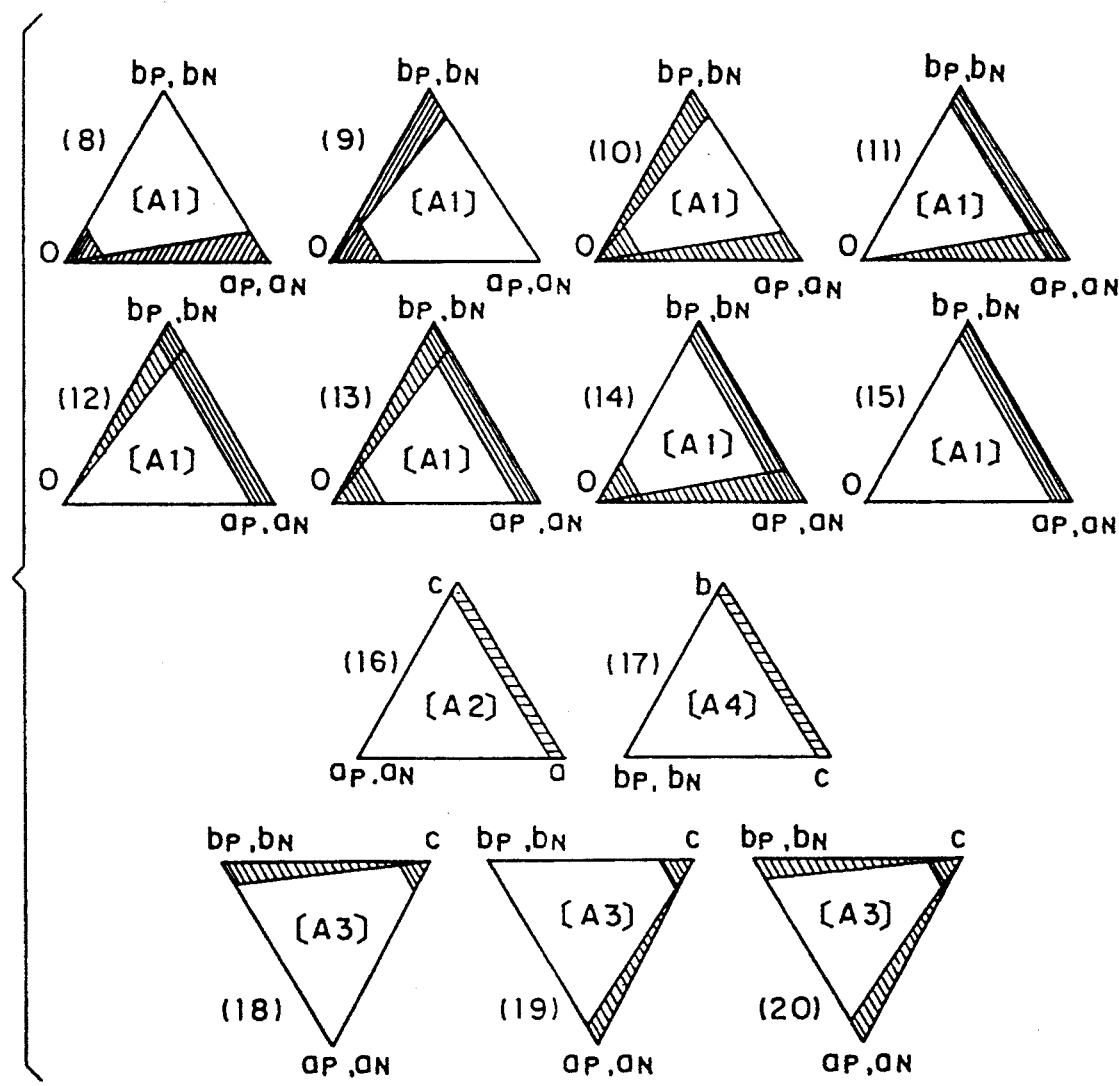
FIG. 21 is a set of views showing in hatching those portions of each region which require short-duration switching under the modulation methods (8) through (20) in connection with the invention.

As an example, the waveforms of the modulation method (8) in FIG. 18A are considered here. With this modulation method, the times for the vectors $b_P$ and $b_N$ become shorter as the command vector approaches zero degree. In that case, as evident from FIG. 18A, the V and W phases require short-duration on- and off-operations. When the absolute value of the command vector is small enough to be near the origin, the time for the vector $0_0$ becomes longer while the times for all of the vectors $a_P$, $b_P$ and $b_N$ become shorter. In that case, all of the U, V and W phases require short-duration on- and off-operations, as illustrated. FIG. 21(8) shows the applicable range of the modulation method (8), the range excluding the hatched portions of the command vectors requiring short-duration switching.

The other modulation methods are evaluated likewise. The results are shown in the various views of FIG. 21 in which the command vector areas requiring short-duration switching for the respective modulation methods are indicated in hatching. As illustrated, there is no single modulation method that would cover the entire region A1 without short-duration switching.

The present invention thus proposes dividing one region into "subregions" to which different modulation methods are assigned individually. Specifically, the region 1 is divided into three subregions. Of these subregions, a subregion 1-1 is close to the origin, a subregion 1-2 is away from the zero vector and close to the vectors $a_P$ and $a_N$, and a subregion 1-3 is away from the zero vector and close to the vectors $b_P$ and $b_N$. The region 3 is divided into two subregions: a subregion 3-1 is close to the voltage vectors $a_P$ and $a_N$; subregion 3-2 is close to the voltage vectors $b_P$ and $b_N$.

Figure 22:
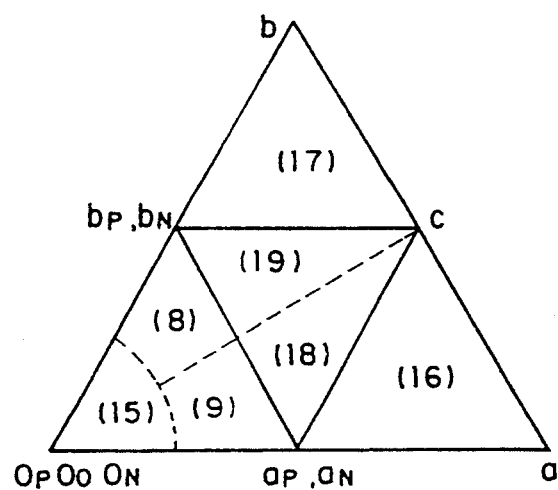
FIG. 22 is a view depicting how different modulation methods are used for each region and for subregions therein over a segment A in connection with the invention.

With the region 1, as shown in FIG. 22, the modulation method (15) is proposed and assigned to the subregion 1-1 near the origin, the modulation method (9) to the subregion 1-2 away from the origin and between 0 and 30 degrees, and the modulation method (8) to the subregion 1-3 away from the origin and between 30 and 60 degrees. The proposed assignment of the modulation methods is also included in FIG. 16.

As described, assigning different modulation methods suitably to the subregions constituting a given region is one of the features of the invention. It is to be noted that the boundaries between subregions are not determined uniquely. For example, in the region 1, there exists a command vector area that does not require short-duration switching with any of the modulation methods (8), (9) and (15). It will then be appreciated that the subregions 1-1, 1-2 and 1-3 may overlap with one another without any adverse effects.

Next, the region A2 surrounded by the vectors a, c and $a_P$ (or $a_N$) is considered. The vectors of the region take the order of $$a_P <\text{-->} c <\text{-->} a <\text{-->} a_N \text{ (method (16))}$$

when arranged in terms of contiguous relation. As with the preceding example, to control the neutral point voltage requires using the vectors $a_P$ and $a_N$ in combination. Thus according to the invention, there is only one modulation method (i.e., method (16)) that is suitable to the region A2.

The same also holds for the region A4. That is, the vectors of the region take the order of $$b_P <\text{-->} b <\text{-->} c <\text{-->} b_N \text{ (method (17))}$$

when arranged in terms of contiguous relation. For the same reason, the only suitable modulation method for the region A4 is the method (17).

Figure 20A:
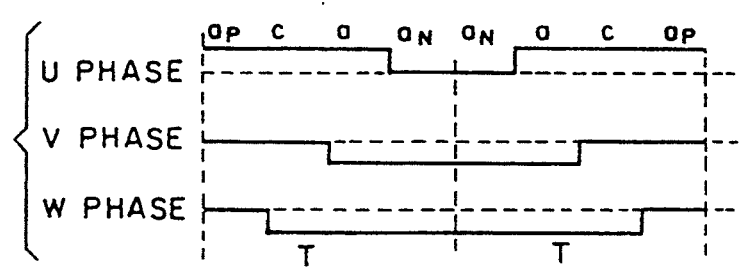
FIGS. 20A–20E show typical voltage waveforms of the respective phases under modulation methods (16) through (20) for regions A2 through A4 in connection with the invention.
Figure 20B:
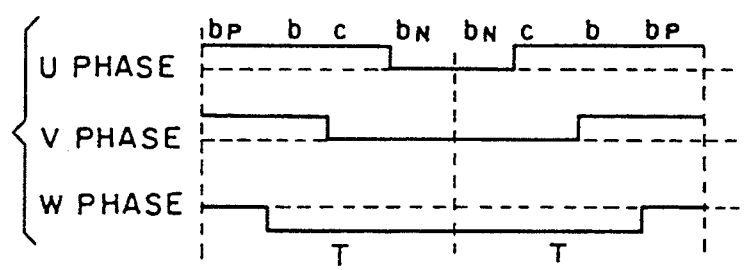

The modulation waveforms applicable to the above two regions are shown in FIGS. 20A and 20B. As indicated by the waveforms, short-duration switching is required for the region A2 when the vectors $a_P$ and $a_N$ are small, as well as for the region A4 when the vectors $b_P$ and $b_N$ are small. This means that larger values of voltage commands theoretically require executing short-duration switching. The phenomenon is theoretically unavoidable and there is no way around it.

Now the region A3 is considered. The voltage vectors of this region take the order of $$a_N <\text{-->} b_N <\text{-->} c <\text{-->} a_P <\text{-->} b_P$$

when arranged in terms of contiguous relation. From this, there are derived the following three vector arrangements that permit control over the neutral point voltage:

(18) $a_N <\text{-->} b_N <\text{-->} c <\text{-->} a_P$

(19) $b_N <\text{-->} c <\text{-->} a_P <\text{-->} b_P$

(20) $a_N <\text{-->} b_N <\text{-->} c <\text{-->} a_P <\text{-->} b_P$

Figure 20C:
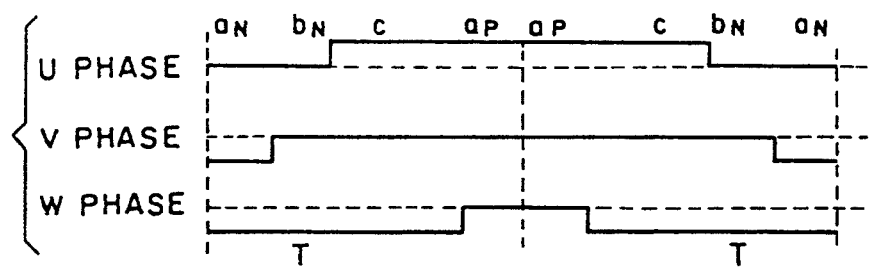
Figure 20D:
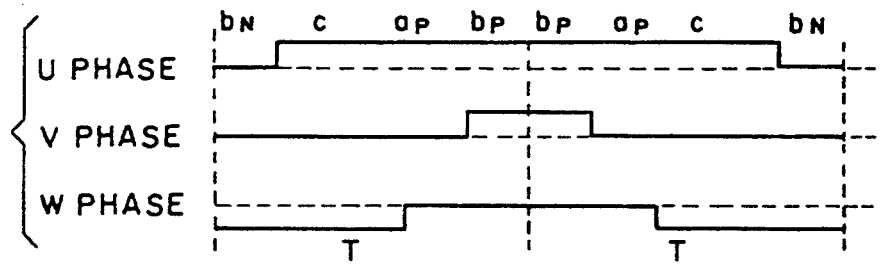
Figure 20E:
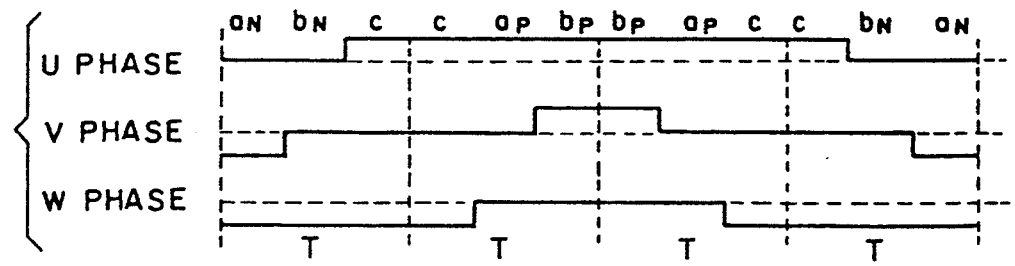

The modulation methods applicable to the above vector arrangements are illustrated in FIGS. 20C, 20D and 20E. As indicated, the modulation method (18) requires short-duration switching when the vectors $a_P$ and $a_N$ are small; the modulation method (19) requires short-duration switching when the vectors $b_P$ and $b_N$ are small; and the modulation method (20) requires short-duration switching when the vectors $a_P$ and $a_N$ are small or when the vectors $b_P$ and $b_N$ are small. In any case, short-duration switching is mandatory near the vector c. This is unavoidable because a maximum output state is in effect here.

On the basis of the above considerations, the invention proposes using either the modulation method (18) when the vectors $b_P$ and $b_N$ are small or the modulation method (19) when the vectors $a_P$ and $a_N$ are small for the region A3.

So far, those modulation methods are identified which allow the neutral point voltage to be controlled without short-duration switching in all regions. These methods are summarized in FIG. 16.

What needs to be done next is to check, as the voltage command vector is moved from one subregion to another in accordance with the varying angle and magnitude involved, whether or not the concept of arranging the voltage vectors consecutively in contiguous relation holds. With reference to FIG. 22, it is necessary to consider in this respect all of the following eight boundaries: one between (18) and (19), another between (16) and (18), another between (9) and (18), another between (8) and (9), another between (9) and (15), another between (17) and (19), another between (8) and (19), and another between (8) and (15).

With symmetry taken into account, the boundaries that fall between 0 and 30 degrees need only be evaluated and the other three boundaries may be disregarded. All modulation methods that are contained in FIG. 22 are listed, again, as follows:

(8) $b_P <\text{-->} a_P <\text{-->} 0_0 <\text{-->} b_N$ (9) $a_P <\text{-->} 0_0 <\text{-->} b_N <\text{-->} a_N$

(15) $0_P <\text{-->} b_P <\text{-->} a_P <\text{-->} 0_0 <\text{-->} b_N <\text{-->} a_N <\text{-->} 0_N$

(16) $a_P <\text{-->} c <\text{-->} a <\text{-->} a_N$

(17) $b_P <\text{-->} b <\text{-->} c <\text{-->} b_N$

(18) $a_N <\text{-->} b_N <\text{-->} c <\text{-->} a_P$

(19) $b_N <\text{-->} c <\text{-->} a_P <\text{-->} b_P$

The boundary between the methods (18) and (19) is now considered. The modulation method (18) ends with the vector $a_N$ or $a_P$. Given any one of the vectors that the modulation method (18) ends with, the contiguity to the method (19) is ensured because the latter method begins with the vector $b_N$ or $b_P$.

The boundary between the methods (16) and (18) is then considered. This case poses no problem because the two modulation methods each begin and end with the vector $a_P$ or $a_N$.

The boundary between the methods (9) and (18) is considered next. As with the boundary between the methods (16) and (18), the contiguity between the two modulation methods is ensured because each method begins and ends with the vector $a_P$ or $a_N$.

In addition, the boundary between the methods (8) and (9) is considered. This case, too, poses no problem because the vector $b_P$ or $b_N$ that the modulation method (8) begins or ends with is contiguous to the vector $a_P$ or $a_N$ that the modulation method (9) begins or ends with.

Lastly, the boundary between the methods (9) and (15) is considered. When the modulation method (9) ends with the vector $a_P$, the contiguity to the method (15) is ensured through the entry of the latter from the vector $0_N$. Meanwhile, the modulation method (15) ends with the vector $0_P$, $0_0$ or $0_N$. If the method (15) ends with the vector $0_0$, the method (9) is made contiguous thereto through entry from the vector $a_P$. If the method (15) ends with the vector $0_N$, the method (9) is made contiguous thereto through entry from the vector $a_N$. If the method (15) ends with the vector $0_P$, the contiguity to the method (9) is not ensured because neither the vector $a_P$ nor the vector $a_N$ exists next to the vector $0_P$. In that case, the modulation method (15) is executed for another carrier period to reach the vector $0_0$, followed by contiguous transition to the modulation method (9). This operation is justified on the ground that the boundaries between subregions are not uniquely determined and that the subregions may overlap with one another, as stated earlier.

How the modulation method (15) is specifically executed will now be described as an example. To control the neutral point voltage through appropriate time allocation between the intermediate voltage vectors MP and MN requires performing modulation in a range twice the carrier period T, as indicated by the waveforms of the modulation method (15) in FIG. 19D. Furthermore, to use the voltage vectors alternately in the forward and reverse orders requires taking a time four times the carrier period. Suppose that the times of duration of the vectors $0_P$, $b_P$, $a_P$, $0_0$, $b_N$, $a_N$ and $0_N$ for two carrier periods (2T) are $T0_P$, $Tb_P$, $Ta_P$, $T0_0$, $Tb_N$, $Ta_N$ and $T0_N$, respectively. In this case, $$T0_P + T0_0 + T0_N + Ta_P + Ta_N + Tb_P + Tb_N = 2T$$

Then the vector duration times $T_2$ and $T_3$ are obtained by use of the formulas in FIG. 17. Over two carrier periods, there exist the relations:

$$Ta_P + Ta_N = 2T_2, \quad Tb_P + Tb_N = 2T_3$$

Now the time allocation between the positive and the negative vectors is arranged properly for control over the neutral point voltage. If the time is assumed to be allocated with a ratio of $(1+f):(1-f)$, then $$Ta_P = T_2(1+f), \quad Ta_N = T_2(1-f)$$

$$Tb_P = T_3(1+f), \quad Tb_N = T_3(1-f)$$

The duration time of the zero vector for the first carrier period T is the remaining time of the MP vector. Therefore $$T0_P + T0_0 = T - (Ta_P + Tb_P)$$

Likewise, for the next carrier period T, the duration time of the zero vector is considered the same as the remaining time of the MN vector. Thus $$T0_N + T0_0 = T - (Ta_N + Tb_N)$$

Because the modulation method (15) is utilized where there is a long zero vector time near the origin, the neutral point voltage is controlled using the signal f so that the preceding expression will not become negative. The above zero vector duration time may be allocated as desired to two zero vectors. In this case, it is assumed that the time is divided equally into two parts. The zero vector times are given as follows:

$$T0_P = T0_0 = [T - (Ta_P + Tb_P)]/2$$

$$T0_N = T0_0 = [T - (Ta_N + Tb_N)]/2$$

Based on the vector times determined by microprocessor in the manner described, the following signals g1, g2 and g3 are sent to comparators Cg1, Cg2 an Cg3:

g1 = $T0_P$, g2 = $T0_P + Tb_P$, g3 = $T0_P + Tb_P + Ta_P$ (in the first carrier period T)

g1 = $T0_N$, g2 = $T0_N + Tb_N$, g3 = $T0_N + Tb_N + Ta_N$ (in the second carrier period T)

g1 = $T0_N$, g2 = $T0_N + Ta_N$, g3 = $T0_N + Ta_N + Tb_N$ (in the third carrier period T)

g1 = $T0_P$, g2 = $T0_P + Ta_P$, g3 = $T0_P + Ta_P + Tb_P$ (in the fourth carrier period T)

Figure 23:
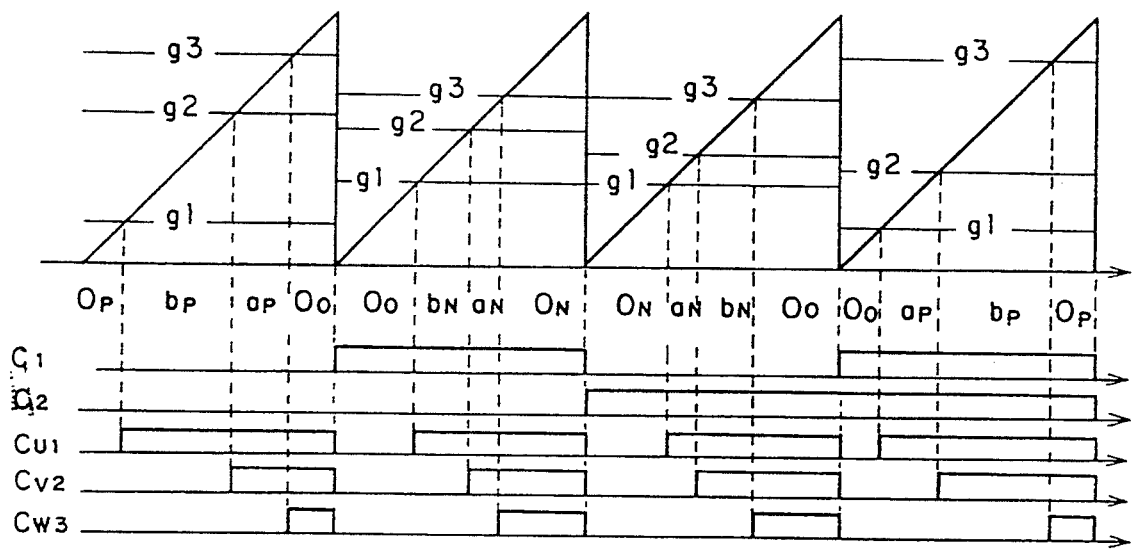
FIG. 23 is a view illustrating the operation waveforms of the circuit side implementing the modulation method (15) in connection with the invention.

As shown in FIG. 23, the output vectors are determined in accordance with the status of five comparators. In FIG. 23, C1 and C2 are signals for identifying any one of the four carrier periods above (the preceding process corresponds to step 6 in FIG. 8).

Below is a consideration of how the modulation method (8) is specifically carried out for the region A1. In order to control the neutral point voltage through appropriate time allocation between the intermediate voltage vectors MP and MN, it is necessary to perform modulation within the range of a carrier period T, as indicated by the waveforms of the modulation method (8) in FIG. 18A. Furthermore, to use the voltage vectors alternately in the forward and reverse orders requires taking a time twice the carrier period.

Suppose that the times of duration of the vectors $b_P$, $a_P$, $0_0$ and $b_N$ for a carrier periods T are $Tb_P$, $Ta_P$, $T0_0$ and $Tb_N$, respectively. In this case, $$Tb_P + Ta_P + T0_0 + Tb_N = T$$

Then the vector duration times $T_1$, $T_2$ and $T_3$ are obtained by use of the formulas in FIG. 17. There exists the relation:

$$Tb_P + Tb_N = T_3$$

Now the time allocation between the positive and the negative vectors is arranged properly for control over the neutral point voltage. If the time is assumed to be allocated with a ratio of $(1+f):(1-f)$, then $$Tb_P = T_3(1+f)/2, \quad Tb_N = T_3(1-f)/2$$

The times for the vectors $a_P$ and $0_0$ are determined with $$T_{aP}=T_2, T_{00}=T_1$$

The remaining time is $Tb_N$, which coincides with the above expression. The times for the respective vectors are determined likewise for the next carrier period, except that the order in which the vectors are output is different.

Based on the vector times determined by microprocessor in the manner described, the following signals g1, g2 and g3 are sent to comparators Cg1, Cg2 an Cg3:

g1=Tb$_P$, g2=Tb$_P$+Ta$_P$, g3=Tb$_P$+Ta$_P$+T0$_0$ (in the first carrier period T)

g1=Tb$_N$, g2=Tb$_N$+T0$_0$, g3=Tb$_N$+T0$_0$+Ta$_P$ (in the second carrier period T)

Figure 24:
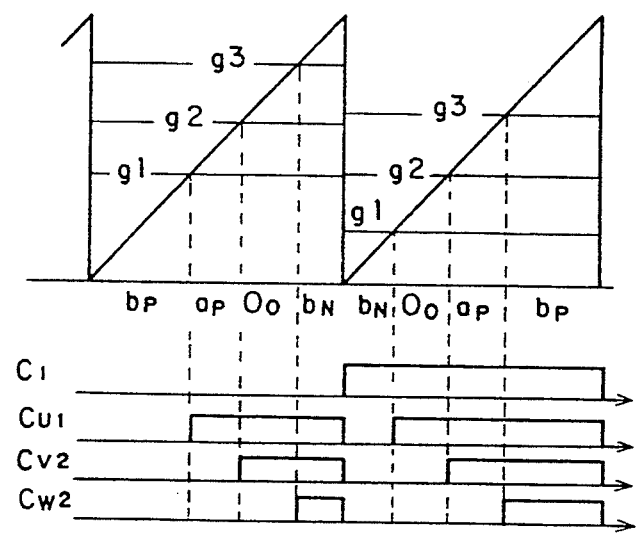
FIG. 24 is a view portraying the operation waveforms of the circuit side implementing the modulation method (8) in connection with the invention.

As shown in FIG. 24, the output vectors are determined in accordance with the status of four comparators. In FIG. 24, C1 is a signal for distinguishing between the two carrier periods.

Specific measures for carrying out the modulation methods (15) and (8) have been described. Like measures also apply to the other modulation methods shown in FIG. 22.

How the signal for control of the neutral point voltage is obtained will now be described (the process corresponds to step 5 in FIG. 8). Initially, values EP and EN in FIG. 2 are detected, and the neutral point voltage deviation ($\Delta$Ed) is obtained as follows:

$$\Delta Ed = E_P - E_N$$

Then the instantaneous load power (PL) is obtained in order to check the direction of power, i.e., whether a power running state or a regenerative state is currently in effect. The power running state is a state in which power is fed from the inverter to the load. The load power may be obtained either on the AC output side or on the DC circuit side of the inverter.

If the polarity of the instantaneous load power PL is represented by sign(PL), the neutral point control signal f is given as $$f = sign(PL) \cdot G(s) \cdot [\Delta Ed / Ed]$$

where, G(s) is a positive transfer function (e.g., a simple gain). As can be seen from the above equation, when the signal f is positive, the MP vector time is prolonged and the MN vector time shortened. In the power running state, the time in which the load is connected to the positive side DC power supply becomes the longer, and the neutral point voltage deviation $\Delta$Ed is modified accordingly. In the regenerative state, the sign of the load power (sign(PL)) becomes negative and the relationship is reversed. Although the direction of power is identified in the above example by checking the polarity of the load power PL, any other control quantity may be used alternatively to determine the direction of power.

How the invention works has been described in detail so far. On the basis of the above description, the constitution of the three-level three-phase inverter apparatus in FIG. 7 embodying the invention will now be described.

In FIG. 7, the microprocessor 1 carries out the steps in FIG. 8 based on a command V$_N$($\theta$, k) from the voltage command generation circuit 2 and produces the control signals g1, g2 and g3. The sawtooth waveform carrier for use in modulation is generated by an oscillator 3 and a counter 4. The low-order bits of the counter are sent as sawtooth waves to digital comparators 5, 6 and 7. The number of the low-order bits should preferably be 8 to 10 so as to ensure modulation accuracy. The high-order bits of the counter 4 are used illustratively as the signals C1 and C2 in FIG. 23. This arrangement is necessary for the microprocessor 1 to carry out its steps in synchronism with the sawtooth waveform carrier.

FIG. 8, a flowchart of the steps outlining the operating principle of this invention, needs no specific description here.

The control signals g1, g2 and g3 are forwarded to the comparators 5, 6 and 7, respectively. As shown in FIG. 23, the comparators turn on and off the signals Cg1, Cg2 and Cg3 at points of intersection between the sawtooth waves and the signals g1, g2 and g3.

Based on the angle $\theta$ and magnitude (modulation factor k) of the voltage command V$_N$, the microprocessor 1 judges the segment, region and subregion designated thereby. The judgment is made by resorting to a prerecorded table prepared on the basis of FIG. 16. With the segment, region and subregion determined, the microprocessor 1 decides on one of the modulation methods in FIG. 16 and notifies the voltage vector selection circuit 8 thereof. The voltage vector selection circuit 8 has a table composed of a ROM. For example, if the microprocessor 1 decides on the modulation method (15) for the region 1 in the segment A, the circuit 8 indicates the recorded switching states of such voltage vectors as $a_P$, $b_P$, $a_N$, $b_N$, $0_P$, $0_N$ and $0_N$ to be output for all combinations of 0's and 1's of the signals C1, C2, Cg1, Cg2 and Cg3 in FIG. 23. Illustratively, if C1=0, C2=0, Cg1=1, Cg2=1 and Cg3=0 in FIG. 23, then the voltage vector $a_P$ is to be output. Since the voltage vector $a_P$ for the region A1 is in the switching state of P00 according to FIG. 13, the ROM table has the data P00 placed at the address (C1, C2, Cg1, Cg2, Cg3)=(0, 0, 1, 1, 0). With the switching state thus clarified, a switching signal generation circuit 9 is fed with a switching command signal for each phase. Three signal lines are used for the three phases, where P, 0 and N are each transmitted over a different line. In turn, the switching signal generation circuit 9 generates specific switching signals S1U, S2U, S3U, S4U, S1V, S2V, S3V, S4V, S1W, S2W, S3W and S4W for each phase, and sends them to a GTO gate driving circuit.

Figure 25:
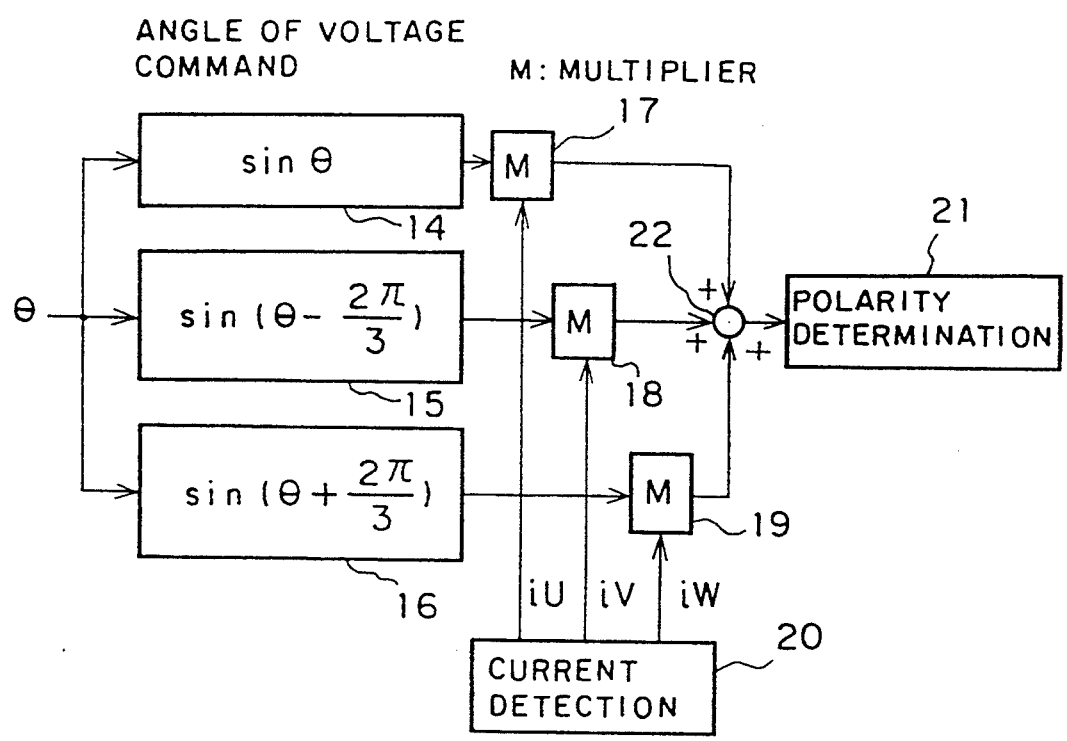
FIG. 25 is a view depicting a typical output power polarity determination circuit in connection with the invention.

A typical polarity determination circuit for an effective load power PL needed in the flowchart of FIG. 8 will now be described with reference to FIG. 25. In FIG. 25, sine wave generation circuits 14, 15 and 16 generate output voltages for the U, V and W phases in accordance with the angle $\theta$ of the voltage command. These output voltages are multiplied respectively by signals $i_U$, $i_V$ and $i_W$ from an output current detection circuit 20. The products are added by an adder 22. The polarity of the sum from the adder 22, when determined, indicates the polarity of the effective load power PL. Where the sum from the adder 22 is multiplied by the magnitude of the voltage command V$_N$, the product indicates the magnitude of the load power. The apparatus of FIG. 7 is constituted so that the polarity of the load power PL thus obtained externally is given to the microprocessor 1. It is obvious that in the setup of FIG. 7, the output current signals $i_U$, $i_V$ and $i_W$ may be sent to the microprocessor 1 to implement the functions of FIG. 25 through appropriate calculations.

Figure 26:
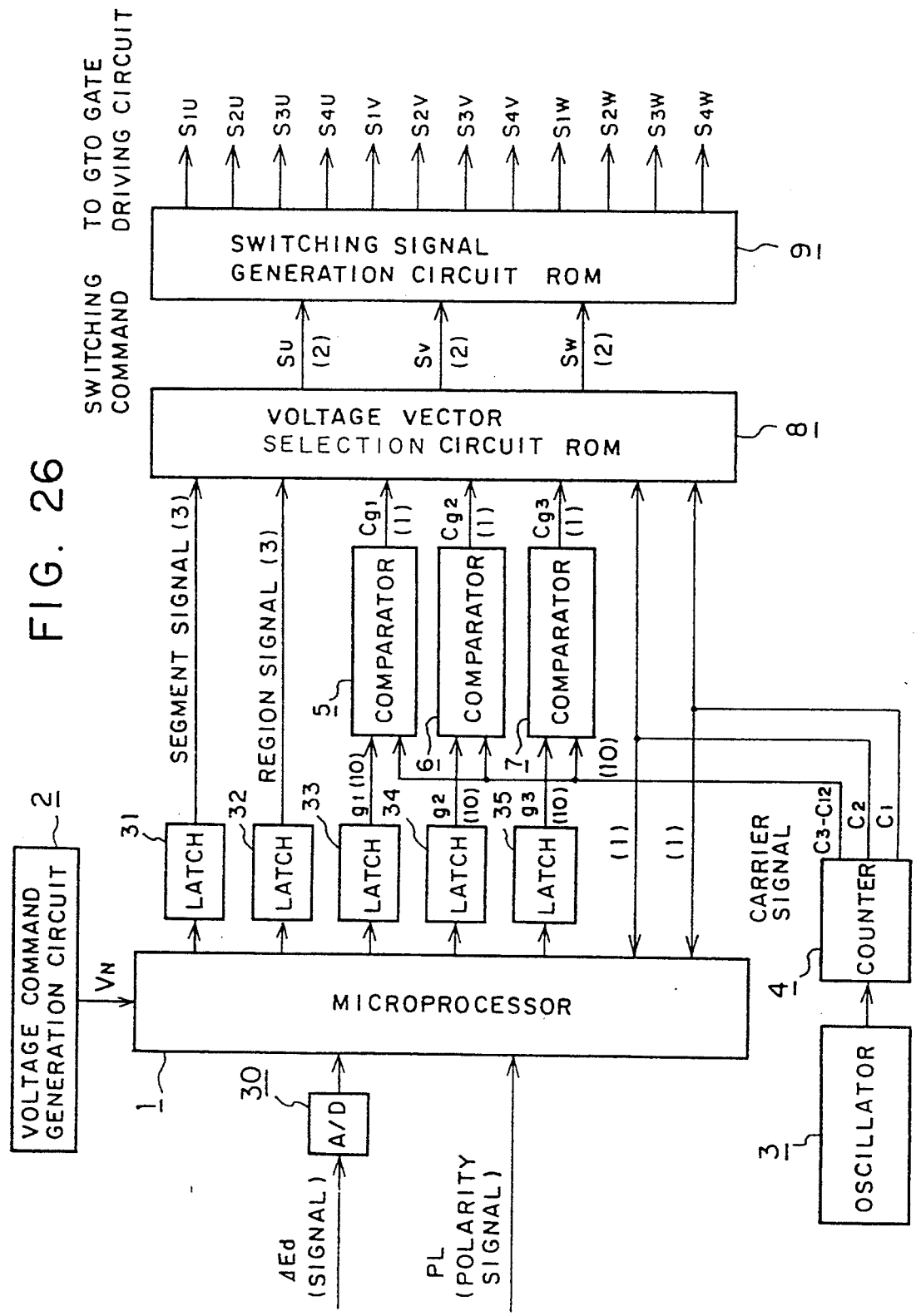
FIG. 26 is a view used to describe specific operations of the embodiment of the invention.

How the embodiment of the invention works will now be described with reference to FIG. 26. First of all, the oscillator 3 and counter 4 output a sawtooth waveform carrier signal. That is, the counter 4 sends a signal C3–C10 of low-order 10 bits as the sawtooth waveform carrier digital signal to the digital comparators 5, 6 and 7. The counter 4 also sends signals C1 and C2 of high-order two bits to the microprocessor 1 as well as to the ROM 8 constituting the voltage vector selection circuit.

In synchronism with leading and trailing edges of the signal C1, the microprocessor 1 outputs a three-bit segment signal, a three-bit region signal, and 10-bit control signals g1, g2 and g3 by performing the following operations. The microprocessor 1 first receives in digital format the amplitude k and phase $\theta$ of the voltage command vector $V_N$ from the voltage command generation circuit 2. The microprocessor 1 also receives the signals C1 and C2 from the counter 4, a neutral point voltage deviation $\Delta Ed$ digitized by an A/D converter 30, and an output power (PL) polarity signal from the output power determination circuit of FIG. 25.

The microprocessor 1 then obtains the three-bit segment signal, three-bit region signal and 10-bit control signals g1, g2 and g3 in accordance with the flowchart of FIG. 8. Using the phase $\theta$ of the voltage command vector $V_N$, the microprocessor 1 initially checks to see which of the six segments A through F in FIG. 9(a) the voltage command vector $V_N$ belongs to. This determines the segment signal. Since there are six segments, the bit count of the segment signal is 3. In correspondence with each of the segments A through F, the segment signal is assigned a number between 1 and 6. For example, if the voltage command vector $V_N$ belongs to the segment C, the signal is numbered 3, or is expressed as (011) in binary notation.

Using the phase $\theta$ (having a period of 360 degrees) of the voltage command vector $V_N$, the microprocessor 1 then finds a 60-degree period phase $\theta$ by performing the following operation:

$$\theta' = \theta - 60 \cdot \text{INT}(\theta/60)$$

where, INT(x) is a maximum integer not exceeding x.

After that, the microprocessor 1 obtains the region signal by checking to see which of the subregions in FIG. 22 the voltage command vector $V_N$ belongs to based on the phase $\theta'$ and the amplitude k of the voltage command vector VN. Since there are seven subregions for each segment, the bit count of the region signal is 3. FIG. 22 shows the numbers of the modulation methods for use with the respective subregions. Each of the subregions that use the modulation methods (15), (8), (9), (17), (19), (18) and (16) is assigned a number between 1 and 7. Illustratively, if the voltage command vector VN belongs to the subregion that uses the modulation method (18), the region signal is numbered 6, or is expressed as (110) in binary notation.

By resorting to FIG. 17, the microprocessor 1 then obtains the voltage vector generation times T1, T2 and T3 in accordance with the segment and region containing the voltage command vector $V_N$. Because the bit count of the sawtooth waveform carrier signal and that of the control signals g1, g2 and g3 are each selected to be 10, the value of the carrier period T is 1024 ($=2^{10}$). That is, T=1 in FIG. 17 for specific operation expressions by which to calculate the generation times. With the generation times calculated, the control signals g1, g2 and g3 computed by use thereof are multiplied by 1024 when output.

Described below is an example of operating on the control signals g1, g2 and g3 where the voltage command vector VN is contained in the subregion 1 of the segment A. The voltage vectors to be used are $0_P$, $b_P$, $a_P$, $0_0$, $b_N$, $a_N$ and $0_N$ corresponding respectively to duration times $T0_P$, $Tb_P$, $Ta_P$, $T0_0$, $Tb_N$, $Ta_N$ and $T0_N$, where $$T0_P + Tb_P + Ta_P + T0_0 + Tb_N + Ta_N + T0_N = 1$$

The neutral point control signal f is then calculated by use of the expression given to 9 in this specification. Because the generation times $T_2$ and $T_3$ have already been calculated, the values of $Ta_P$, $Ta_N$, $Tb_P$ and $Tb_N$ are obtained by use of the expressions given in this specification. The values of the remaining T0, $T0_0$ and $T0_N$ are obtained by resorting to the expressions given on lines 24 and 25 of page 45.

Next, the control signals g1, g2 and g3 are obtained in accordance with the levels of the signals C1 and C2 output by the counter 4. That is, as depicted in FIG. 23, the control signals for the first T (C1 and C2 at Low level) are given as:

$$g1 = T0_P, \; g2 = T0_P + Tb_P, \; g3 = T0_P + Tb_P + Ta_P$$

The control signals for the second T (C1 at High level, C2 at Low level) are given as:

$$g1 = T0_N, \; g2 = T0_N + Tb_N, \; g3 = T0_N + Tb_N + Ta_N$$

The control signals for the third T (C1 at Low level, C2 at High level) are given as:

$$g1 = T0_N, \; g2 = T0_N + Ta_N, \; g3 = T0_N + Ta_N + Tb_N$$

The control signals for the fourth T (C1 and C2 at High level) are given as:

$$g1 = T0_P, \; g2 = T0_P + Ta_P, \; g3 = T0_P + Ta_P + Tb_P$$

As mentioned, the control signals g1, g2 and g3 are multiplied by 1024 before being output.

After performing the above operations, the microprocessor 1 outputs the three-bit segment signal and three-bit region signal as address signals to the ROM 8 (voltage vector selection circuit) in synchronism with the period T of the sawtooth waveform carrier signal. At the same time, the microprocessor 1 outputs the 10-bit control signals g1, g2 and g3 to the comparators 5, 6 and 7. At this point, these signals are latched for a period of T by latch circuits 31 through 35.

The comparators 5, 6 and 7 compare the 10-bit control signals g1, g2 and g3 with the sawtooth waveform carrier signal. The resulting signals Cg1, Cg2 and Cg3 are output as address signals to the ROM 8.

The arrangement outlined above requires the address bit count of the ROM 8 to be 11. Suppose that an 11-bit address contains, in descending order, bits AD1, AD2, ..., Ad11. These bits are assigned illustratively as follows:

AD1–AD3: segment signal
AD4–AD6: region signal
AD7–AD9: signals Cg1, Cg2, Cg3
AD10: signal C1
AD11: signal C2

The ROM 8 stores the switching states of the voltage vectors to be output in accordance with various addresses. Since there are three switch states, P, 0 and N, for each of the U, V and W phases, two bits of data may be assigned to each phase. Illustratively, values of 1, 2 and 3 may be assigned to the states of P, 0 and N, respectively. In this case, the switching state of P is represented by the value of 3, or (11) in binary notation. Thus the data bit count is 6; the switching states for the U, V and W phases are each assigned two bits in descending bit order.

At this point, data are stored in the ROM 8 in the manner described below. Suppose that the voltage command vector VN belongs to the subregion 1 of the segment A. In this case, as shown in FIG. 23, the data to be stored in the ROM 8 are as follows:

With the address (00100100000) corresponding to the switching state of $0_P$ (PPP), the applicable data are (111111).

With the address (00100110000) corresponding to the switching state of $b_P$ (PP0), the applicable data are (111110).

With the address (00100111000) corresponding to the switching state of $a_P$ (P00), the applicable data are (111010).

With the address (00100111100) corresponding to the switching state of $0_0$ (000), the applicable data are (101010).

With the address (00100100010) corresponding to the switching state of $0_0$ (000), the applicable data are (101010).

With the address (00100110010) corresponding to the switching state of $b_N$ (00N), the applicable data are (101001).

With the address (00100111010) corresponding to the switching state of $a_N$ (0NN), the applicable data are (100101).

With the address (00100111110) corresponding to the switching state of $0_N$ (NNN), the applicable data are (010101).

With the address (00100100001) corresponding to the switching state of $0_N$ (NNN), the applicable data are (110101).

With the address (00100110001) corresponding to the switching state of $a_N$ (0NN), the applicable data are (100101).

With the address (00100111001) corresponding to the switching state of $b_N$ (00N), the applicable data are (101001).

With the address (00100111101) corresponding to the switching state of $0_0$ (000), the applicable data are (101010).

With the address (00100100011) corresponding to the switching state of $0_0$ (000), the applicable data are (101010).

With the address (00100110011) corresponding to the switching state of $a_P$ (P00), the applicable data are (111010).

With the address (00100111011) corresponding to the switching state of $b_P$ (PP0), the applicable data are (111110).

With the address (00100111111) corresponding to the switching state of $0_P$ (PPP), the applicable data are (111111).

With the address (00100100010) corresponding to the switching state of $0_0$ (000), the applicable data are (101010).

With the address (00100110010) corresponding to the switching state of $b_N$ (00N), the applicable data are (101001).

With the address (00100111010) corresponding to the switching state of $a_N$ (0NN), the applicable data are (100101).

With the address (00100111110) corresponding to the switching state of $0_N$ (NNN), the applicable data are (010101).

With the address (00100100001) corresponding to the switching state of $0_N$ (NNN), the applicable data are (110101).

With the address (00100110001) corresponding to the switching state of $a_N$ (0NN), the applicable data are (100101).

With the address (00100100010) corresponding to the switching state of $0_0$ (000), the applicable data are (101010).

With the address (00100110010) corresponding to the switching state of $b_N$ (00N), the applicable data are (101001).

When the voltage command vector $V_N$ belongs to another region or another segment, the ROM data are determined in the same manner as above.

The six-bit signal output by the ROM 8, which is the voltage vector selection circuit, is used as an address signal to the switching signal generation circuit, or ROM 9. It is assumed here that the six-bit signal from the ROM 8 contains bits D1, D2, D3, D4, D5 and D6 in descending bit order and assigned respectively to address signal bits AD1, AD2, AD3, AD4, AD5 and AD6 to the ROM 9. The switching states of voltage vectors correspond on a one-to-one basis to the on- and off-states of the GTO elements constituting the three-level inverter circuit, as shown in the table of FIG. 10. The data to be stored in the ROM 9 are readily prepared from this table. Suppose that the on- and off-states of a GTO element corresponds to 1 and 0, respectively. In that case, the data whose address corresponds to (111001) are (110001100011). In the 12-bit signal, the bits correspond in descending bit order to the on/off signals of GTO elements S1U, S2U, S3U, S4U, S1V, S2V, S3V, S4V, S1W, S2W, S3W and S4W, respectively.

Although the descriptions above assume that the carrier period of PWM is kept constant, other assumptions may be adopted and the modulation principle of this invention still holds. Illustratively, the carrier period may be deliberately subjected to the modulation at twice the output frequency in order to reduce the harmonics involved. As another example, the distribution of harmonics may be dispersed through random frequency modulation, whereby the noise involved is softened.

In the foregoing descriptions, the segments A through F are established, and the voltage vectors $a_P$, $b_P$, etc. are grouped so that the segment A is used as the representative segment for the regions and subregions. The location of a given voltage command is determined relative to the regions or subregions in the above segments including the segment A. For each region or subregion, the previously selected and stored modulation method corresponding thereto is read out and executed. An alternative to this arrangement is to eliminate the segments so that each of the regions and subregions distributed in a 360-degree range is keyed to a previously selected and stored modulation method. In operation, the region (subregion) to which the voltage command belongs is detected, and the modulation method corresponding to that region (subregion) is read out and executed.

Another alternative is that the voltage command $V_N$, instead of being given in polar coordinates, may be provided in any other format as long as the region to which the command belongs is clearly identified.

Although the descriptions above have not touched on applications particularly suitable for the inverter apparatus according to the invention, the benefits of the apparatus afford it a wide range of applications. Since the biggest feature of the inverter apparatus is its ability to readily select any of the optimum modulation methods that meet diverse objectives and different operating conditions, the apparatus will find its way into such varied uses as AC motors under vector control, active filters, and inverter-equipped receptive-power controllers.

The three-level three-phase inverter apparatus according to the invention stores beforehand the combination of modulation methods (voltage vectors) and the order in which the methods (vectors) are output for each of the regions established. An appropriate modulation method is read out in accordance with the region determined on the basis of the voltage command furnished. The modulation method determines the manner in which the switching devices are activated. This makes it possible to adopt an optimum modulation method that meets specific conditions of any region selected. Thus the three-level three-phase inverter apparatus provides its control performance effectively at full capacity.

In one setup, as described, the modulation methods to be stored require that transition between two voltage vectors be performed in single-phase switching alone and that the switching between the P and N states be avoided. This setup eliminates awkward operations of the switching devices constituting the inverter apparatus so that the apparatus will run in a stable manner.

In another setup, as depicted, selected voltage vectors may be a mixture of positive and negative vectors. This setup cancels out the inflow and outflow of currents to and from the neutral point of the DC power supply. Even where the neutral point is divided by a capacitor arrangement, the possible fluctuation of the potential involved is effectively suppressed.

In a further setup, the voltage vectors equal in certain attributes are classified as one group so that the voltage vectors of each group are handled in a uniform manner from a control point of view. This setup reduces the actual number of voltage vector types and thereby simplifies the control procedures.

In yet another setup, a given region of a voltage vector is divided into a plurality of subregions, each subregion being assigned a different modulation method. This setup prevents the on- and off-times of switching devices from falling below predetermined levels, whereby the range of applications is expanded for switching devices such as GTO's having relatively long minimum on- and off-times.

As many apparently different embodiments of this invention may be made without departing from the spirit and scope thereof, it is to be understood that the invention is not limited to the specific embodiments thereof except as defined in the appended claims.

What is claimed is:

1. A three-level three-phase inverter apparatus comprising a three-level inverter for each of U, V and W phases, each three-level inverter comprising:
    a direct current power supply having a neutral point output terminal and including a first, a second, a third and a fourth switching device connected in series between the positive and negative electrodes of said direct power supply, the junction between said first and said second switching devices and the junction between said third and said fourth switching devices being each connected to said neutral point output terminal via a clamp device, the junction between said second and said third switching devices constituting an inverter output terminal, wherein P represents the state in which said first and said second switching devices are turned on, 0 stands for the state in which said second and said third switching devices are turned on, and N denotes the state in which said third and said fourth switching devices are turned on; the switching states of each phase determining voltage vectors of which three contiguous vertexes constitute a region;
    voltage vector selecting means for preselecting at least three voltage vectors constituting each vertex of the region, for determining beforehand the order in which to output the voltage vectors within a carrier period, and for storing the voltage vectors and the voltage vector output order;
    voltage command generating means for outputting a voltage command in vector format;
    region determining means for receiving the voltage command in order to determine the region to which the voltage command is positioned per carrier period;
    operation time determining means for determining the allocation of operation times within the carrier period of each voltage vector selected for the region determined by said region determining means so that an inverter output voltage will coincide with the voltage command; and
    switching signal generating means for outputting a signal for driving the switching devices of each phase based on the operation time for each voltage vector.

2. A three-level three-phase inverter apparatus according to claim 1, wherein the voltage vectors contiguous in said voltage vector output order stored in said voltage vector selecting means are switched from one vector to another within the switching time for any one phase, the switching being accomplished in any one of two transitions, one from P to 0 and the other from 0 to N.

3. A three-level three-phase inverter apparatus according to claim 1, wherein said voltage vectors are divided into a positive vector group and a negative vector group, said positive vector group having two switching states P and 0, said negative vector group having two switching states N and 0, said voltage vector output order stored in said voltage vector selecting means being composed mixedly of vectors from both groups for consecutive output within a predetermined carrier period, whereby the fluctuation of the potential at said neutral point of said direct current power supply is suppressed.

4. A three-level three-phase inverter apparatus according to claim 2, wherein said voltage vectors are divided into a positive vector group and a negative vector group, said positive vector group having two switching states P and 0, said negative vector group having two switching states N and 0, said voltage vector output order stored in said voltage vector selecting means being composed mixedly of vectors from both groups for consecutive output within a predetermined carrier period, whereby the fluctuation of the potential at said neutral point of said direct current power supply is suppressed.

5. A three-level three-phase inverter apparatus according to claim 3, wherein the voltage vectors in said positive and said negative vector groups are controlled in operation time allocation so as to suppress the fluctuation of the potential at said neutral point of said direct current power supply.

6. A three-level three-phase inverter apparatus according to claim 4, wherein the voltage vectors in said positive and said negative vector groups are controlled in operation time allocation so as to suppress the fluctuation of the potential at said neutral point of said direct current power supply.

7. A three-level three-phase inverter apparatus according to claim 1, wherein said voltage vector selecting means classifies as one group the voltage vectors equal in vector magnitude and in zero-phase voltage.

8. A three-level three-phase inverter apparatus according to claim 7, wherein the voltage vectors are classified into the following groups:

| Voltage vector symbol | Name of each voltage vector represented by symbol |
| --- | --- |
| PPP | → $0_P$ |
| 000 | → 0 |
| NNN | → $0_N$ |
| P00, 0P0, 00P | → $a_P$ |
| PP0, 0PP, P0P | → $b_P$ |
| 0NN, N0N, NN0 | → $a_N$ |
| 00N, N00, 0N0 | → $b_N$ |
| P0N, 0PN, NP0, N0P, 0NP, PN0 | → c |
| PNN, NPN, NNP | → a |
| PPN, NPP, PNP | → b |

9. A three-level three-phase inverter apparatus according to claim 1, wherein a given region of the voltage vectors stored in said voltage vector selecting means is divided into a plurality of subregions, each of said subregions being assigned a different combination of voltage vectors to be consecutively output within a carrier period, whereby the minimum on- and off-times of said switching devices are kept above a predetermined value each.

10. A three-level three-phase inverter apparatus according to claim 2, wherein a given region of the voltage vectors stored in said voltage vector selecting means is divided into a plurality of subregions, each of said subregions being assigned a different combination of voltage vectors to be consecutively output within a carrier period, whereby the minimum on- and off-times of said switching devices are kept above a predetermined value each.

11. A three-level three-phase inverter apparatus according to claim 3, wherein a given region of the voltage vectors stored in said voltage vector selecting means is divided into a plurality of subregions, each of said subregions being assigned a different combination of voltage vectors to be consecutively output within a carrier period, whereby the minimum on- and off-times of said switching devices are kept above a predetermined value each.

12. A three-level three-phase inverter apparatus according to claim 4, wherein a given region of the voltage vectors stored in said voltage vector selecting means is divided into a plurality of subregions, each of said subregions being assigned a different combination of voltage vectors to be consecutively output within a carrier period, whereby the minimum on- and off-times of said switching devices are kept above a predetermined value each.

13. A three-level three-phase inverter apparatus according to claim 5, wherein a given region of the voltage vectors stored in said voltage vector selecting means is divided into a plurality of subregions, each of said subregions being assigned a different combination of voltage vectors to be consecutively output within a carrier period, whereby the minimum on- and off-times of said switching devices are kept above a predetermined value each.

14. A three-level three-phase inverter apparatus according to claim 6, wherein a given region of the voltage vectors stored in said voltage vector selecting means is divided into a plurality of subregions, each of said subregions being assigned a different combination of voltage vectors to be consecutively output within a carrier period, whereby the minimum on- and off-times of said switching devices are kept above a predetermined value each.

15. A three-level three-phase inverter apparatus according to claim 7, wherein a given region of the voltage vectors stored in said voltage vector selecting means is divided into a plurality of subregions, each of said subregions being assigned a different combination of voltage vectors to be consecutively output within a carrier period, whereby the minimum on- and off-times of said switching devices are kept above a predetermined value each.

16. A three-level three-phase inverter apparatus according to claim 8, wherein a given region of the voltage vectors stored in said voltage vector selecting means is divided into a plurality of subregions, each of said subregions being assigned a different combination of voltage vectors to be consecutively output within a carrier period, whereby the minimum on- and off-times of said switching devices are kept above a predetermined value each.

17. A three-level three-phase inverter apparatus according to claim 9, wherein the voltage vectors are classified into the groups listed below; and wherein the region containing the origin of the coordinates for the voltage vectors are divided into a first, a second and a third subregion; said first subregion having voltage vectors $0_P$, $b_P$, $a_P$, $0_0$, $b_N$, $a_N$ and $0_N$ arranged therein for output therefrom in one of two orders alternately, one order being in the forward direction and the other in the reverse direction, the absolute values of the first subregion voltage vectors being below a predetermined value each; said second subregion having voltage vectors $a_P$, $0_0$, $b_N$ and $a_N$ arranged therein for output therefrom in one of two orders alternately, one order being in the forward direction and the other in the reverse direction, the absolute values of the second subregion voltage vectors being above a predetermined value each, the angles of said second subregion voltage vectors ranging from the approximate center of said second subregion to any one of two voltage vectors $a_P$ and $a_N$; said third subregion having voltage vectors $b_P$, $a_P$, $0_0$ and $b_N$ arranged therein for output therefrom in one of two orders alternately, one order being in the forward direction and the other in the reverse direction, the absolute values of the third subregion voltage vectors being above a predetermined value each, the angles of said third region voltage vectors ranging from the approximate center of said third subregion to any one of two voltage vectors $b_P$ and $b_N$:

| Voltage vector symbol | Name of each voltage vector represented by symbol |
|---|---|
| PPP | → $0_P$ |
| 000 | → 0 |
| NNN | → $0_N$ |
| P00, 0P0, 00P | → $a_P$ |
| PP0, 0PP, P0P | → $b_P$ |
| 0NN, N0N, NN0 | → $a_N$ |
| 00N, N00, 0N0 | → $b_N$ |
| P0N, 0PN, NP0, N0P, 0NP, PN0 | → c |
| PNN, NPN, NNP | → a |
| PPN, NPP, PNP | → b |

18. A three-level three-phase inverter apparatus according to claim 10, wherein the voltage vectors are classified into the groups listed below; and wherein the region containing the origin of the coordinates for the voltage vectors are divided into a first, a second and a third subregion; said first subregion having voltage vectors $0_P$, $b_P$, $a_P$, $0_0$, $b_N$, $a_N$ and $0_N$ arranged therein for output therefrom in one of two orders alternately, one order being in the forward direction and the other in the reverse direction, the absolute values of the first subregion voltage vectors being below a predetermined value each; said second subregion having voltage vectors $a_P$, $0_0$, $b_N$ and $a_N$ arranged therein for output therefrom in one of two orders alternately, one order being in the forward direction and the other in the reverse direction, the absolute values of the second subregion voltage vectors being above a predetermined value each, the angles of said second subregion voltage vectors ranging from the approximate center of said second subregion to any one of two voltage vectors $a_P$ and $a_N$; said third subregion having voltage vectors $b_P$, $a_P$, $0_0$ and $b_N$ arranged therein for output therefrom in one of two orders alternately, one order being in the forward direction and the other in the reverse direction, the absolute values of the third subregion voltage vectors being above a predetermined value each, the angles of said third region voltage vectors ranging from the approximate center of said third subregion to any one of two voltage vectors $b_P$ and $b_N$:

| Voltage vector symbol | Name of each voltage vector represented by symbol |
|---|---|
| PPP | → $0_P$ |
| 000 | → 0 |
| NNN | → $0_N$ |
| P00, 0P0, 00P | → $a_P$ |
| PP0, 0PP, P0P | → $b_P$ |
| 0NN, N0N, NN0 | → $a_N$ |
| 00N, N00, 0N0 | → $b_N$ |
| P0N, 0PN, NP0, N0P, 0NP, PN0 | → c |
| PNN, NPN, NNP | → a |
| PPN, NPP, PNP | → b |

19. A three-level three-phase inverter apparatus according to claim 11, wherein the voltage vectors are classified into the groups listed below; and wherein the region containing the origin of the coordinates for the voltage vectors are divided into a first, a second and a third subregion; said first subregion having voltage vectors $0_P$, $b_P$, $a_P$, $0_0$, $b_N$, $a_N$ and $0_N$ arranged therein for output therefrom in one of two orders alternately, one order being in the forward direction and the other in the reverse direction, the absolute values of the first subregion voltage vectors being below a predetermined value each; said second subregion having voltage vectors $a_P$, $0_0$, $b_N$ and $a_N$ arranged therein for output therefrom in one of two orders alternately, one order being in the forward direction and the other in the reverse direction, the absolute values of the second subregion voltage vectors being above a predetermined value each, the angles of said second subregion voltage vectors ranging from the approximate center of said second subregion to any one of two voltage vectors $a_P$ and $a_N$; said third subregion having voltage vectors $b_P$, $a_P$, $0_0$ and $b_N$ arranged therein for output therefrom in one of two orders alternately, one order being in the forward direction and the other in the reverse direction, the absolute values of the third subregion voltage vectors being above a predetermined value each, the angles of said third region voltage vectors ranging from the approximate center of said third subregion to any one of two voltage vectors $b_P$ and $b_N$:

| Voltage vector symbol | Name of each voltage vector represented by symbol |
|---|---|
| PPP | → $0_P$ |
| 000 | → 0 |
| NNN | → $0_N$ |
| P00, 0P0, 00P | → $a_P$ |
| PP0, 0PP, P0P | → $b_P$ |
| 0NN, N0N, NN0 | → $a_N$ |
| 00N, N00, 0N0 | → $b_N$ |
| P0N, 0PN, NP0, N0P, 0NP, PN0 | → c |
| PNN, NPN, NNP | → a |
| PPN, NPP, PNP | → b |

20. A three-level three-phase inverter apparatus according to claim 12, wherein the voltage vectors are classified into the groups listed below; and wherein the region containing the origin of the coordinates for the voltage vectors are divided into a first, a second and a third subregion; said first subregion having voltage vectors $0_P$, $b_P$, $a_P$, $0_0$, $b_N$, $a_N$ and $0_N$ arranged therein for output therefrom in one of two orders alternately, one order being in the forward direction and the other in the reverse direction, the absolute values of the first subregion voltage vectors being below a predetermined value each; said second subregion having voltage vectors $a_P$, $0_0$, $b_N$ and $a_N$ arranged therein for output therefrom in one of two orders alternately, one order being in the forward direction and the other in the reverse direction, the absolute values of the second subregion voltage vectors being above a predetermined value each, the angles of said second subregion voltage vectors ranging from the approximate center of said second subregion to any one of two voltage vectors $a_P$ and $a_N$; said third subregion having voltage vectors $b_P$, $a_P$, $0_0$ and $b_N$ arranged therein for output therefrom in one of two orders alternately, one order being in the forward direction and the other in the reverse direction, the absolute values of the third subregion voltage vectors being above a predetermined value each, the angles of said third region voltage vectors ranging from the approximate center of said third subregion to any one of two voltage vectors $b_P$ and $b_N$:

| Voltage vector symbol | Name of each voltage vector represented by symbol |
|---|---|
| PPP | → $0_P$ |
| 000 | → 0 |
| NNN | → $0_N$ |
| P00, 0P0, 00P | → $a_P$ |
| PP0, 0PP, P0P | → $b_P$ |
| 0NN, N0N, NN0 | → $a_N$ |
| 00N, N00, 0N0 | → $b_N$ |
| P0N, 0PN, NP0, N0P, 0NP, PN0 | → c |
| PNN, NPN, NNP | → a |
| PPN, NPP, PNP | → b |

21. A three-level three-phase inverter apparatus according to claim 13, wherein the voltage vectors are classified into the groups listed below; and wherein the region containing the origin of the coordinates for the voltage vectors are divided into a first, a second and a third subregion; said first subregion having voltage vectors $0_P$, $b_P$, $a_P$, $0_0$, $b_N$, $a_N$ and $0_N$ arranged therein for output therefrom in one of two orders alternately, one order being in the forward direction and the other in the reverse direction, the absolute values of the first subregion voltage vectors being below a predetermined value each; said second subregion having voltage vectors $a_P$, $0_0$, $b_N$ and $a_N$ arranged therein for output therefrom in one of two orders alternately, one order being in the forward direction and the other in the reverse direction, the absolute values of the second subregion voltage vectors being above a predetermined value each, the angles of said second subregion voltage vectors ranging from the approximate center of said second subregion to any one of two voltage vectors $a_P$ and $a_N$; said third subregion having voltage vectors $b_P$, $a_P$, $0_0$ and $b_N$ arranged therein for output therefrom in one of two orders alternately, one order being in the forward direction and the other in the reverse direction, the absolute values of the third subregion voltage vectors being above a predetermined value each, the angles of said third region voltage vectors ranging from the approximate center of said third subregion to any one of two voltage vectors $b_P$ and $b_N$:

| Voltage vector symbol | Name of each voltage vector represented by symbol |
|---|---|
| PPP | → $0_P$ |
| 000 | → 0 |
| NNN | → $0_N$ |
| P00, 0P0, 00P | → $a_P$ |
| PP0, 0PP, P0P | → $b_P$ |
| 0NN, N0N, NN0 | → $a_N$ |
| 00N, N00, 0N0 | → $b_N$ |
| P0N, 0PN, NP0, N0P, 0NP, PN0 | → c |
| PNN, NPN, NNP | → a |
| PPN, NPP, PNP | → b |

22. A three-level three-phase inverter apparatus according to claim 14, wherein the voltage vectors are classified into the groups listed below; and wherein the region containing the origin of the coordinates for the voltage-vectors are divided into a first, a second and a third subregion; said first subregion having voltage vectors $0_P$, $b_P$, $a_P$, $0_0$, $b_N$, $a_N$ and $0_N$ arranged therein for output therefrom in one of two orders alternately, one order being in the forward direction and the other in the reverse direction, the absolute values of the first subregion voltage vectors being below a predetermined value each; said second subregion having voltage vectors $a_P$, $0_0$, $b_N$ and $a_N$ arranged therein for output therefrom in one of two orders alternately, one order being in the forward direction and the other in the reverse direction, the absolute values of the second subregion voltage vectors being above a predetermined value each, the angles of said second subregion voltage vectors ranging from the approximate center of said second subregion to any one of two voltage vectors $a_P$ and $a_N$; said third subregion having voltage vectors $b_P$, $a_P$, $0_0$ and $b_N$ arranged therein for output therefrom in one of two orders alternately, one order being in the forward direction and the other in the reverse direction, the absolute values of the third subregion voltage vectors being above a predetermined value each, the angles of said third region voltage vectors ranging from the approximate center of said third subregion to any one of two voltage vectors $b_P$ and $b_N$:

| Voltage vector symbol | Name of each voltage vector represented by symbol |
|---|---|
| PPP | → $0_P$ |
| 000 | → 0 |
| NNN | → $0_N$ |
| P00, 0P0, 00P | → $a_P$ |
| PP0, 0PP, P0P | → $b_P$ |
| 0NN, N0N, NN0 | → $a_N$ |
| 00N, N00, 0N0 | → $b_N$ |
| P0N, 0PN, NP0, N0P, 0NP, PN0 | → c |
| PNN, NPN, NNP | → a |
| PPN, NPP, PNP | → b |

23. A three-level three-phase inverter apparatus according to claim 15, wherein the voltage vectors are classified into the groups listed below; and wherein the region containing the origin of the coordinates for the voltage vectors are divided into a first, a second and a third subregion; said first subregion having voltage vectors $0_P$, $b_P$, $a_P$, $0_0$, $b_N$, $a_N$ and $0_N$ arranged therein for output therefrom in one of two orders alternately, one order being in the forward direction and the other in the reverse direction, the absolute values of the first subregion voltage vectors being below a predetermined value each; said second subregion having voltage vectors $a_P$, $0_0$, $b_N$ and $a_N$ arranged therein for output therefrom in one of two orders alternately, one order being in the forward direction and the other in the reverse direction, the absolute values of the second subregion voltage vectors being above a predetermined value each, the angles of said second subregion voltage vectors ranging from the approximate center of said second subregion to any one of two voltage vectors $a_P$ and $a_N$; said third subregion having voltage vectors $b_P$, $a_P$, $0_0$ and $b_N$ arranged therein for output therefrom in one of two orders alternately, one order being in the forward direction and the other in the reverse direction, the absolute values of the third subregion voltage vectors being above a predetermined value each, the angles of said third region voltage vectors ranging from the approximate center of said third subregion to any one of two voltage vectors $b_P$ and $b_N$:

| Voltage vector symbol | Name of each voltage vector represented by symbol |
|---|---|
| PPP | → $0_P$ |
| 000 | → 0 |
| NNN | → $0_N$ |
| P00, 0P0, 00P | → $a_P$ |
| PP0, 0PP, P0P | → $b_P$ |
| 0NN, N0N, NN0 | → $a_N$ |
| 00N, N00, 0N0 | → $b_N$ |
| P0N, 0PN, NP0, N0P, 0NP, PN0 | → c |
| PNN, NPN, NNP | → a |
| PPN, NPP, PNP | → b |

24. A three-level three-phase inverter apparatus according to claim 17, wherein the region formed by one of the voltage vectors $a_P$ and $a_N$, by one of the voltage vectors $b_P$ and $b_N$, and by the voltage vector c is divided into a fourth and a fifth subregion; said fourth subregion having the voltage vectors $a_N$, $b_N$, C and $a_P$ arranged therein for output therefrom in one of two orders alternately, one order being in the forward direction and the other in the reverse direction, the angles of the fourth subregion voltage vectors ranging from the approximate center of said fourth subregion to any one of two voltage vectors $a_P$ and $a_N$; said fifth subregion having the voltage vectors $b_N$, c, $a_P$ and $b_P$ arranged therein for output therefrom in one of two orders alternately, one order being in the forward direction and the other in the reverse direction, the angles of the fifth subregion voltage vectors ranging from the approximate center of said fifth subregion to any one of two voltage vectors $b_P$ and $b_N$.

25. A three-level three-phase inverter apparatus according to claim 18, wherein the region formed by one of the voltage vectors $a_P$ and $a_N$, by one of the voltage vectors $b_P$ and $b_N$, and by the voltage vector c is divided into a fourth and a fifth subregion; said fourth subregion having the voltage vectors $a_N$, $b_N$, c and $a_P$ arranged therein for output therefrom in one of two orders alternately, one order being in the forward direction and the other in the reverse direction, the angles of the fourth subregion voltage vectors ranging from the approximate center of said fourth subregion to any one of two voltage vectors $a_P$ and $a_N$; said fifth subregion having the voltage vectors $b_N$, c, $a_P$ and $b_P$ arranged therein for output therefrom in one of two orders alternately, one order being in the forward direction and the other in the reverse direction, the angles of the fifth subregion voltage vectors ranging from the approximate center of said fifth subregion to any one of two voltage vectors $b_P$ and $b_N$.

26. A three-level three-phase inverter apparatus according to claim 19, wherein the region formed by one of the voltage vectors $a_P$ and $a_N$, by one of the voltage vectors $b_P$ and $b_N$, and by the voltage vector c is divided into a fourth and a fifth subregion; said fourth subregion having the voltage vectors $a_N$, $b_N$, c and $a_P$ arranged therein for output therefrom in one of two orders alternately, one order being in the forward direction and the other in the reverse direction, the angles of the fourth subregion voltage vectors ranging from the approximate center of said fourth subregion to any one of two voltage vectors $a_P$ and $a_N$; said fifth subregion having the voltage vectors $b_N$, c, $a_P$ and $b_P$ arranged therein for output therefrom in one of two orders alternately, one order being in the forward direction and the other in the reverse direction, the angles of the fifth subregion voltage vectors ranging from the approximate center of said fifth subregion to any one of two voltage vectors $b_P$ and $b_N$.

27. A three-level three-phase inverter apparatus according to claim 20, wherein the region formed by one of the voltage vectors $a_P$ and $a_N$, by one of the voltage vectors $b_P$ and $b_N$, and by the voltage vector c is divided into a fourth and a fifth subregion; said fourth subregion having the voltage vectors $a_N$, $b_N$, c and $a_P$ arranged therein for output therefrom in one of two orders alternately, one order being in the forward direction and the other in the reverse direction, the angles of the fourth subregion voltage vectors ranging from the approximate center of said fourth subregion to any one of two voltage vectors $a_P$ and $a_N$; said fifth subregion having the voltage vectors $b_N$, c, $a_P$ and $b_P$ arranged therein for output therefrom in one of two orders alternately, one order being in the forward direction and the other in the reverse direction, the angles of the fifth subregion voltage vectors ranging from the approximate center of said fifth subregion to any one of two voltage vectors $b_P$ and $b_N$.

28. A three-level three-phase inverter apparatus according to claim 21, wherein the region formed by one of the voltage vectors $a_P$ and $a_N$, by one of the voltage vectors $b_P$ and $b_N$, and by the voltage vector c is divided into a fourth and a fifth subregion; said fourth subregion having the voltage vectors $a_N$, $b_N$, c and $a_P$ arranged therein for output therefrom in one of two orders alternately, one order being in the forward direction and the other in the reverse direction, the angles of the fourth subregion voltage vectors ranging from the approximate center of said fourth subregion to any one of two voltage vectors $a_P$ and $a_N$; said fifth subregion having the voltage vectors $b_N$, c, $a_P$ and $b_P$ arranged therein for output therefrom in one of two orders alternately, one order being in the forward direction and the other in the reverse direction, the angles of the fifth subregion voltage vectors ranging from the approximate center of said fifth subregion to any one of two voltage vectors $b_P$ and $b_N$.

29. A three-level three-phase inverter apparatus according to claim 22, wherein the region formed by one of the voltage vectors $a_P$ and $a_N$, by one of the voltage vectors $b_P$ and $b_N$, and by the voltage vector c is divided into a fourth and a fifth subregion; said fourth subregion having the voltage vectors $a_N$, $b_N$, c and $a_P$ arranged therein for output therefrom in one of two orders alternately, one order being in the forward direction and the other in the reverse direction, the angles of the fourth subregion voltage vectors ranging from the approximate center of said fourth subregion to any one of two voltage vectors $a_P$ and $a_N$; said fifth subregion having the voltage vectors $b_N$, c, $a_P$ and $b_P$ arranged therein for output therefrom in one of two orders alternately, one order being in the forward direction and the other in the reverse direction, the angles of the fifth subregion voltage vectors ranging from the approximate center of said fifth subregion to any one of two voltage vectors $b_P$ and $b_N$.

30. A three-level three-phase inverter apparatus according to claim 23, wherein the region formed by one of the voltage vectors $a_P$ and $a_N$, by one of the voltage vectors $b_P$ and $b_N$, and by the voltage vector c is divided into a fourth and a fifth subregion; said fourth subregion having the voltage vectors $a_N$, $b_N$, c and $a_P$ arranged therein for output therefrom in one of two orders alternately, one order being in the forward direction and the other in the reverse direction, the angles of the fourth subregion voltage vectors ranging from the approximate center of said fourth subregion to any one of two voltage vectors $a_P$ and $a_N$; said fifth subregion having the voltage vectors $b_N$, c, $a_P$ and $b_P$ arranged therein for output therefrom in one of two orders alternately, one order being in the forward direction and the other in the reverse direction, the angles of the fifth subregion voltage vectors ranging from the approximate center of said fifth subregion to any one of two voltage vectors $b_P$ and $b_N$.

31. A three-level three-phase inverter apparatus according to claim 9, wherein the voltage vectors contiguous in said voltage vector output order stored in said voltage vector selecting means are such that between two contiguous regions, one voltage vector is replaced by another through a switching operation of any one phase, the switching being accomplished in any one of two transitions, one from P to 0 and the other from 0 to N.

32. A three-level three-phase inverter apparatus according to claim 10, wherein the voltage vectors contiguous in said voltage vector output order stored in said voltage vector selecting means are such that between two contiguous regions, one voltage vector is replaced by another through a switching operation of any one phase, the switching being accomplished in any one of two transitions, one from P to 0 and the other from 0 to N.

33. A three-level three-phase inverter apparatus according to claim 11, wherein the voltage vectors contiguous in said voltage vector output order stored in said voltage vector selecting means are such that between two contiguous regions, one voltage vector is replaced by another through a switching operation of any one phase, the switching being accomplished in any one of two transitions, one from P to 0 and the other from 0 to N.

34. A three-level three-phase inverter apparatus according to claim 12, wherein the voltage vectors contiguous in said voltage vector output order stored in said voltage vector selecting means are such that between two contiguous regions, one voltage vector is replaced by another through a switching operation of any one phase, the switching being accomplished in any one of two transitions, one from P to 0 and the other from 0 to N.

35. A three-level three-phase inverter apparatus according to claim 13, wherein the voltage vectors contiguous in said voltage vector output order stored in said voltage vector selecting means are such that between two contiguous regions, one voltage vector is replaced by another through a switching operation of any one phase, the switching being accomplished in any one of two transitions, one from P to 0 and the other from 0 to N.

36. A three-level three-phase inverter apparatus according to claim 14, wherein the voltage vectors contiguous in said voltage vector output order stored in said voltage vector selecting means are such that between two contiguous regions, one voltage vector is replaced by another through a switching operation of any one phase, the switching being accomplished in any one of two transitions, one from P to 0 and the other from 0 to N.

37. A three-level three-phase inverter apparatus according to claim 15, wherein the voltage vectors contiguous in said voltage vector output order stored in said voltage vector selecting means are such that between two contiguous regions, one voltage vector is replaced by another through a switching operation of any one phase, the switching being accomplished in any one of two transitions, one from P to 0 and the other from 0 to N.

38. A three-level three-phase inverter apparatus according to claim 16, wherein the voltage vectors contiguous in said voltage vector output order stored in said voltage vector selecting means are such that between two contiguous regions, one voltage vector is replaced by another through a switching operation of any one phase, the switching being accomplished in any one of two transitions, one from P to 0 and the other from 0 to N.

39. A three-level three-phase inverter apparatus according to claim 17, wherein the voltage vectors contiguous in said voltage vector output order stored in said voltage vector selecting means are such that between two contiguous regions, one voltage vector is replaced by another through a switching operation of any one phase, the switching being accomplished in any one of two transitions, one from P to 0 and the other from 0 to N.

40. A three-level three-phase inverter apparatus according to claim 18, wherein the voltage vectors contiguous in said voltage vector output order stored in said voltage vector selecting means are such that between two contiguous regions, one voltage vector is replaced by another through a switching operation of any one phase, the switching being accomplished in any one of two transitions, one from P to 0 and the other from 0 to N.

41. A three-level three-phase inverter apparatus according to claim 19, wherein the voltage vectors contiguous in said voltage vector output order stored in said voltage vector selecting means are such that between two contiguous regions, one voltage vector is replaced by another through a switching operation of any one phase, the switching being accomplished in any one of two transitions, one from P to 0 and the other from 0 to N.

42. A three-level three-phase inverter apparatus according to claim 20, wherein the voltage vectors contiguous in said voltage vector output order stored in said voltage vector selecting means are such that between two contiguous regions, one voltage vector is replaced by another through a switching operation of any one phase, the switching being accomplished in any one of two transitions, one from P to 0 and the other from 0 to N.

43. A three-level three-phase inverter apparatus according to claim 21, wherein the voltage vectors contiguous in said voltage vector output order stored in said voltage vector selecting means are such that between two contiguous regions, one voltage vector is replaced by another through a switching operation of any one phase, the switching being accomplished in any one of two transitions, one from P to 0 and the other from 0 to N.

44. A three-level three-phase inverter apparatus according to claim 22, wherein the voltage vectors contiguous in said voltage vector output order stored in said voltage vector selecting means are such that between two contiguous regions, one voltage vector is replaced by another through a switching operation of any one phase, the switching being accomplished in any one of

45. A three-level three-phase inverter apparatus according to claim 23, wherein the voltage vectors contiguous in said voltage vector output order stored in said voltage vector selecting means are such that between two contiguous regions, one voltage vector is replaced by another through a switching operation of any one phase, the switching being accomplished in any one of two transitions, one from P to 0 and the other from 0 to N.

46. A three-level three-phase inverter apparatus according to claim 24, wherein the voltage vectors contiguous in said voltage vector output order stored in said voltage vector selecting means are such that between two contiguous regions, one voltage vector is replaced by another through a switching operation of any one phase, the switching being accomplished in any one of two transitions, one from P to 0 and the other from 0 to N.

47. A three-level three-phase inverter apparatus according to claim 25, wherein the voltage vectors contiguous in said voltage vector output order stored in said voltage vector selecting means are such that between two contiguous regions, one voltage vector is replaced by another through a switching operation of any one phase, the switching being accomplished in any one of two transitions, one from P to 0 and the other from 0 to N.

48. A three-level three-phase inverter apparatus according to claim 26, wherein the voltage vectors contiguous in said voltage vector output order stored in said voltage vector selecting means are such that between two contiguous regions, one voltage vector is replaced by another through a switching operation of any one phase, the switching being accomplished in any one of two transitions, one from P to 0 and the other from 0 to N.

49. A three-level three-phase inverter apparatus according to claim 27, wherein the voltage vectors contiguous in said voltage vector output order stored in said voltage vector selecting means are such that between two contiguous regions, one voltage vector is replaced by another through a switching operation of any one phase, the switching being accomplished in any one of two transitions, one from P to 0 and the other from 0 to No

50. A three-level three-phase inverter apparatus according to claim 28, wherein the voltage vectors contiguous in said voltage vector output order stored in said voltage vector selecting means are such that between two contiguous regions, one voltage vector is replaced by another through a switching operation of any one phase, the switching being accomplished in any one of two transitions, one from P to 0 and the other from 0 to N.

51. A three-level three-phase inverter apparatus according to claim 29, wherein the voltage vectors contiguous in said voltage vector output order stored in said voltage vector selecting means are such that between two contiguous regions, one voltage vector is replaced by another through a switching operation of any one phase, the switching being accomplished in any one of two transitions, one from P to 0 and the other from 0 to N.

52. A three-level three-phase inverter apparatus according to claim 30, wherein the voltage vectors contiguous in said voltage vector output order stored in said voltage vector selecting means are such that between two contiguous regions, one voltage vector is replaced by another through a switching operation of any one phase, the switching being accomplished in any one of two transitions, one from P to 0 and the other from 0 to N.

* * * * *